(12) United States Patent
Paerschke et al.

(10) Patent No.: US 12,291,915 B2
(45) Date of Patent: May 6, 2025

(54) DOOR MOTION CONTROLLER WITH ACCELEROMETER COMPENSATION

(71) Applicant: MAGNA CLOSURES INC., Newmarket (CA)

(72) Inventors: Roman Paerschke, Newmarket (CA); Martin Dannemann, Newmarket (CA); Sebastian Prengel, Newmarket (CA); John G. Zeabari, Newmarket (CA)

(73) Assignee: MAGNA CLOSURES INC., Newmarket (CA)

( * ) Notice: Subject to any disclaimer, the term of this patent is extended or adjusted under 35 U.S.C. 154(b) by 155 days.

(21) Appl. No.: 18/110,016

(22) Filed: Feb. 15, 2023

(65) Prior Publication Data

US 2023/0258036 A1    Aug. 17, 2023

Related U.S. Application Data

(60) Provisional application No. 63/311,094, filed on Feb. 17, 2022.

(51) Int. Cl.
*H02P 7/00* (2016.01)
*E05F 15/616* (2015.01)
(Continued)

(52) U.S. Cl.
CPC .......... *E05F 15/616* (2015.01); *E05F 15/622* (2015.01); *H02P 7/05* (2016.02);
(Continued)

(58) Field of Classification Search
CPC .. E05F 15/622; H02P 7/05; H02P 8/12; H02P 2205/01
See application file for complete search history.

(56) References Cited

U.S. PATENT DOCUMENTS 7,504,792 B2    3/2009  Pellarin et al.
8,459,094 B2    6/2013  Yanni
(Continued)

FOREIGN PATENT DOCUMENTS

EP      3812701 A1    4/2021
WO   2013013313 A1    1/2013
(Continued)

*Primary Examiner* — Karen Masih
(74) *Attorney, Agent, or Firm* — Dickinson Wright PLLC

(57) ABSTRACT

A system for opening or closing a closure member of a vehicle and an accelerometer calibration method are provided. The system includes an actuator assembly with an electric motor operably coupled to an extensible member for opening or closing the closure member. The system also includes an accelerometer configured to sense movement of the closure member and output an accelerometer signal. An actuator controller is coupled to electric motor and to the accelerometer and is configured to determine an adjusted accelerometer signal as the accelerometer signal adjusted using one of a plurality of predetermined compensation factors determined through an accelerometer calibration process temporally before installation of the accelerometer in the vehicle. The actuator controller then controls the opening or closing of the closure member using the electric motor based on the movement of the closure member as represented by the adjusted accelerometer signal.

16 Claims, 16 Drawing Sheets

(51) Int. Cl.
   *E05F 15/622*    (2015.01)
   *H02P 7/03*      (2016.01)
   *H02P 8/12*      (2006.01)

(52) U.S. Cl.
   CPC ............ *H02P 8/12* (2013.01); *E05Y 2400/31* (2013.01); *E05Y 2900/531* (2013.01); *H02P 2205/01* (2013.01)

(56) References Cited

U.S. PATENT DOCUMENTS

| | | |
|---|---|---|
| 8,466,639 B2 | 6/2013 | Parison et al. |
| 8,626,471 B2 | 1/2014 | Kennedy et al. |
| 10,295,559 B2 | 5/2019 | Dawson et al. |
| 10,774,571 B2 | 9/2020 | Zeabari et al. |
| 10,774,574 B2 | 9/2020 | Lamm |
| 2014/0096587 A1 | 4/2014 | Stewart et al. |
| 2018/0100331 A1 | 4/2018 | Cumbo |
| 2018/0238099 A1 | 8/2018 | Schatz et al. |
| 2018/0328097 A1 | 11/2018 | Holt et al. |
| 2022/0268074 A1 | 8/2022 | Leonard et al. |

FOREIGN PATENT DOCUMENTS

| | | |
|---|---|---|
| WO | 2021081664 A1 | 5/2021 |
| WO | WO-2022199770 A1 * | 9/2022 |

\* cited by examiner

DOOR MOTION CONTROLLER WITH ACCELEROMETER COMPENSATION

CROSS-REFERENCE TO RELATED APPLICATION

This utility application claims the benefit of U.S. Provisional Application No. 63/311,094 filed Feb. 17, 2022. The entire disclosure of the above application is incorporated herein by reference.

FIELD

The present disclosure relates to a power actuator for a vehicle closure. More specifically, the present disclosure relates to a controller for a power actuator assembly for a vehicle side door including accelerometer compensation.

BACKGROUND

This section provides background information related to the present disclosure which is not necessarily prior art.

Closure members of motor vehicles may be mounted by one or more hinges to the vehicle body. For example, passenger doors may be oriented and attached to the vehicle body by the one or more hinges for swinging movement about a generally vertical pivot axis. In such an arrangement, each door hinge typically includes a door hinge strap connected to the passenger door, a body hinge strap connected to the vehicle body, and a pivot pin arranged to pivotably connect the door hinge strap to the body hinge strap and define a pivot axis. Such swinging passenger doors ("swing doors") may be moveable by power closure member actuation systems. Specifically, the power closure member system can function to automatically swing the passenger door about its pivot axis between the open and closed positions, to assist the user as he or she moves the passenger door, and/or to automatically move the passenger door in between closed and open positions for the user.

Typically, power closure member actuation systems include a power-operated device such as, for example, an electric motor and a rotary-to-linear conversion device that are operable for converting the rotary output of the electric motor into translational movement of an extensible member. In many arrangements, the electric motor and the conversion device are mounted to the passenger door and the distal end of the extensible member is fixedly secured to the vehicle body. One example of a power closure member actuation system for a passenger door is shown in commonly-owned International Publication No. WO2013/013313 to Scheuring et al. which discloses use of a rotary-to-linear conversion device having an externally-threaded leadscrew rotatively driven by the electric motor and an internally-threaded drive nut meshingly engaged with the leadscrew and to which the extensible member is attached. Accordingly, control over the speed and direction of rotation of the leadscrew results in control over the speed and direction of translational movement of the drive nut and the extensible member for controlling swinging movement of the passenger door between its open and closed positions.

Power closure member actuation systems may be operable to automatically move the passenger door, for example, in response to a single input (e.g., switch activation) or may continuously assist movement during a continuous force input (e.g., assisting with movement as the user moves the passenger door). Such power closure member actuation systems typically rely on accurate sensor readings to correctly determine a position of the passenger door.

In view of the above, there remains a need to develop improved systems for opening or closing a closure member of a vehicle, methods of calibrating sensors, and using compensated sensor values which address and overcome limitations and drawbacks associated with known power closure member actuation systems as well as to provide increased accuracy and enhanced operational capabilities.

SUMMARY

This section provides a general summary of the disclosure, and is not a comprehensive disclosure of its full scope or all of its features.

It is an object of the present disclosure to provide a system for opening or closing a closure member of a vehicle. The system includes an actuator assembly including an electric motor operably coupled to an extensible member coupled to one of a body or the closure member for opening or closing the closure member. The system also includes an accelerometer configured to sense movement of the closure member and output an accelerometer signal corresponding to the movement sensed. An actuator controller is coupled to electric motor and to the accelerometer and is configured to detect the movement of the closure member using the accelerometer. The actuator controller is also configured to determine an adjusted accelerometer signal as the accelerometer signal adjusted using one of a plurality of predetermined compensation factors determined through an accelerometer calibration process temporally before installation of the accelerometer in the vehicle. The actuator controller then controls the opening or closing of the closure member using the electric motor based on the movement of the closure member as represented by the adjusted accelerometer signal.

In another aspect, the system further comprises a current sensor for detecting a sensed current flowing in the electric motor, wherein the haptic control algorithm is further configured to receive the sensed current and calculate a target torque.

In another aspect, the system further comprises a drive unit for converting the compensation force into a target current to be provided to the closed loop current control system.

In another aspect, the haptic control algorithm includes a summation of a plurality of forces from a plurality of force calculations by a summer that outputs the target torque to the drive unit, the plurality of force calculations include a friction force calculation that receives a velocity of the door and outputs a friction force, a detent force calculation that receives a position of the door and outputs a detent force, an incline force calculation that receives the acceleration signal and outputs an incline force, an inertia force calculation that receives the acceleration signal and outputs an inertia force, a drive mode force calculation that receives the position of the door and the velocity of the door and outputs a drive mode force, a slam protect force calculation that receives the position of the door and the velocity of the door and outputs a slam protect force, and a user input torque force calculation that receives the sensed current from the current sensor 406 and outputs a user input torque force.

In another aspect, the system further comprises an accelerometer compensation module of the actuator controller configured to adjust the accelerometer signal before the accelerometer signal is used by the incline force calculation and the inertia force calculation of the haptic control algorithm.

In another aspect, the closed loop current control system includes a motor block connected to an H-bridge block and a subtractor configured to subtract a sensed current from the current sensor from the target current from the drive unit to output a corrected current to the motor block, the motor block and H-bridge block are configured to convert the corrected current to the drive current sensed by the current sensor.

In another aspect, the system further comprises a door position sensor configured to detect an angular position of the closure member and output a position of the door.

In another aspect, the door position sensor is a Hall-effect sensor.

According to another aspect, a method of compensating an accelerometer signal of an accelerometer installed in a vehicle is provided. The accelerometer is for sensing movement of a closure member. The method includes the step of receiving the accelerometer signal from the accelerometer. The next step of the method is determining an adjusted accelerometer signal as the accelerometer signal adjusted using one of a plurality of predetermined compensation factors determined through an accelerometer calibration process. The method also includes the step of calculating a compensation force to be applied to the closure member using the adjusted accelerometer signal.

In another aspect, the accelerometer calibration process occurs temporally before installation of the accelerometer in the vehicle.

According to yet another aspect, an accelerometer calibration process of an accelerometer of a vehicle for sensing movement of a closure member is also provided. The method includes the step of mounting the accelerometer in a controller housing of a controller. Next, mounting the controller housing to a calibration fixture. The next step of the method is orienting the controller housing and the accelerometer in each of a plurality of angles relative to a starting position using the calibration fixture while simultaneously determining differences between an accelerometer signal obtained when the accelerometer is oriented at each of the plurality of angles compared to a predetermined expected accelerometer signal for each of the plurality of angles. The method proceeds by determining a plurality of predetermined compensation factors based on the differences between the accelerometer signal and the predetermined expected accelerometer signal for each of the plurality of angles. The method continues with the step of programming an accelerometer compensation module of the controller to adjust the accelerometer signal to an adjusted accelerometer signal adjusted accelerometer signal by the plurality of predetermined compensation factors.

According to a further aspect, a system for opening or closing a closure member of a vehicle is also provided. The system comprises an actuator assembly comprising an electric motor operably coupled to an extensible member coupled to one of a body or the closure member for opening or closing the closure member. The system also comprises an accelerometer configured to sense one of movement and orientation of the closure member and output an accelerometer signal corresponding to the one of movement and orientation of the closure member sensed. The electric motor is controlled using an adjusted accelerometer signal.

In another aspect, the system further comprises a controller coupled to the electric motor and to the accelerometer, wherein the controller is adapted to receive the accelerometer signal, generate the adjusted accelerometer signal, and control the electric motor based on the adjusted accelerometer signal.

According to an additional aspect, a control system for controlling an electric motor of an actuator assembly used for opening or closing a closure member is provided. The control system comprises an accelerometer configured to output an accelerometer signal. The control system also comprises a controller configured to receive the accelerometer signal, the controller further adapted to adjust the accelerometer signal based on at least one predetermined parameter to generate an adjusted accelerometer signal, and control the electric motor using the adjusted accelerometer signal.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings. Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

Figure 1:
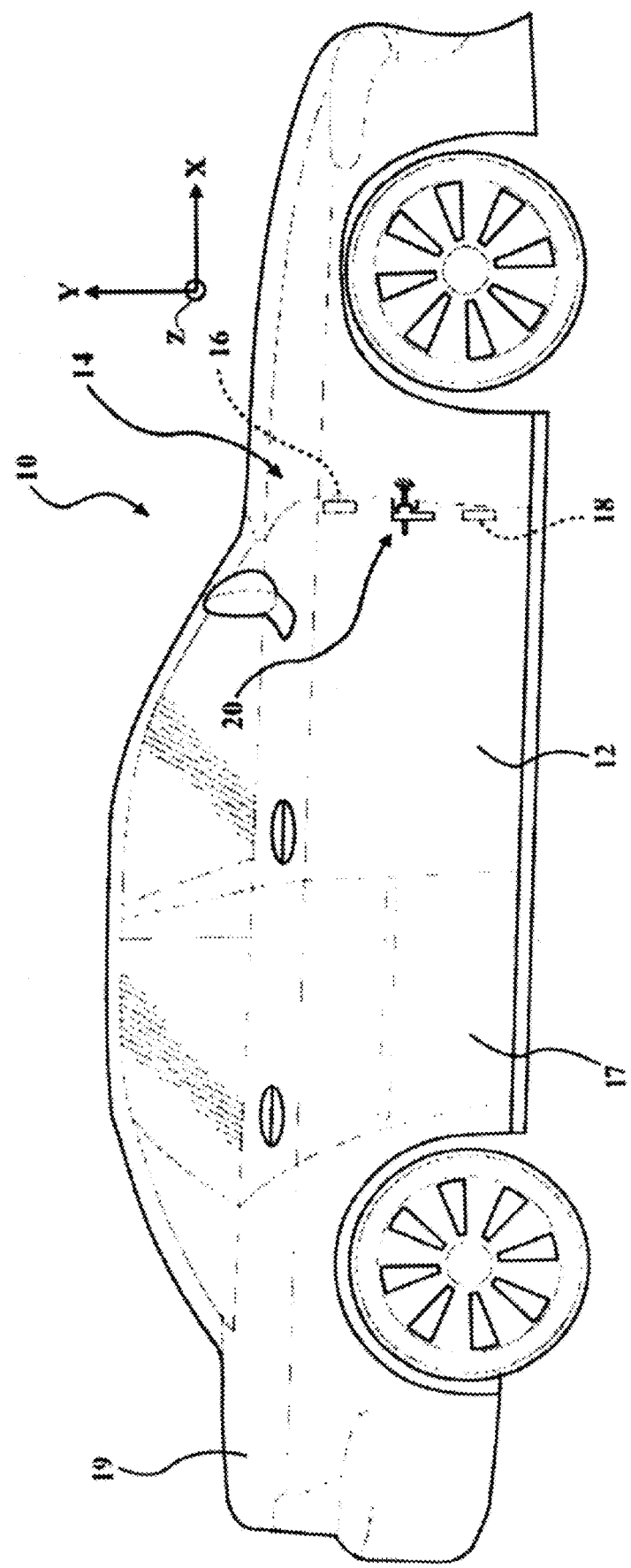
FIG. 1 is a perspective view of an example motor vehicle equipped with a power closure member actuation system situated between the front passenger swing door and a vehicle body, according to aspects of the disclosure.

Referring initially to FIG. 1, an example motor vehicle 10 is shown to include a first passenger door 12 pivotally mounted to a vehicle body 14 via an upper door hinge 16 and a lower door hinge 18 which are shown in phantom lines. In accordance with the present disclosure, a power closure member actuation system 20 is pivotally connected between first passenger door 12 and the vehicle body 14. In accordance with a preferred configuration, power closure member actuation system 20 generally includes a power-operated actuator mechanism or actuator 22 secured within an internal cavity of passenger door 12, and a rotary drive mechanism that is driven by the power-operated actuator mechanism 22 and is drivingly coupled to the vehicle body 14. Driven rotation of the rotary drive mechanism causes controlled pivotal movement of passenger door 12 relative to vehicle body 14. In accordance with this preferred configuration, the power-operated actuator mechanism 22 is pivotally coupled to and in close proximity with the shut face of the door 12 between hinges 16, 18 while the rotary drive mechanism is pivotally coupled to the vehicle body 14. However, those skilled in the art will recognize that alternative packaging configurations for power closure member actuation system 20 are available to accommodate available packaging space. One such alternative packaging configuration may include mounting the power-operated actuator mechanism 22 to vehicle body 14 and drivingly interconnecting the rotary drive mechanism to the door 12.

Each of upper door hinge 16 and lower door hinge 18 include a door-mounting hinge component and a body-mounted hinge component that are pivotably interconnected by a hinge pin or post. The door-mounted hinge component is hereinafter referred to a door hinge strap while the body-mounted hinge component is hereinafter referred to as a body hinge strap. While power closure member actuation system 20 is only shown in association with front passenger door 12, those skilled in the art will recognize that the power closure member actuation system 20 can also be associated with any other closure member (e.g., door or liftgate) of vehicle 10 such as rear passenger doors 17 and decklid 19 as examples.

Figure 2:
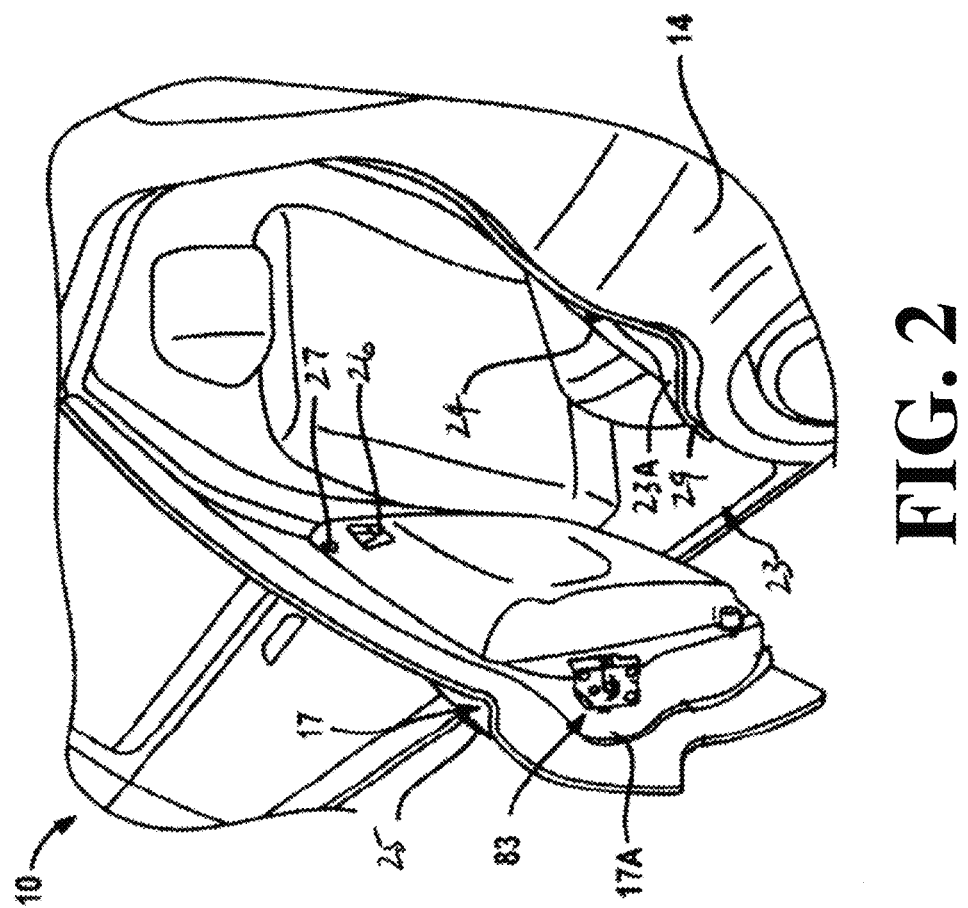
FIG. 2 is a partial perspective view of the motor vehicle with another closure member equipped with a latch assembly, according to aspects of the disclosure.

Referring now to FIG. 2, the vehicle body 14 of the motor vehicle 10 defines an opening 23 to an interior passenger compartment. The closure member, for example, rear passenger door 17, is illustratively shown pivotably mounted to vehicle body 14 for movement between an open position (shown) and a fully-closed position to respectively open and close opening 23 with latch assembly 83. Examples of latch assembly 83 can be found in U.S. Publication No. 2018/0100331, which is hereby incorporated by reference. While rear passenger door 17 is shown, it should be understood that the latch assembly 83 could alternatively or additionally be used for door 12 and/or power closure member actuation system 20 can be used for rear passenger door 17. The latch assembly 83 is shown secured to rear passenger door 17 adjacent to an edge portion 17A thereof and includes a latch mechanism that is releasably engageable with a striker 24 fixedly secured to a recessed edge portion 23A of opening 23. As will be detailed, latch assembly 83 is operable to engage striker 24 and releasably hold closure member 17 in its fully-closed position. An outside handle 25 and an inside handle 26 are provided for selectively actuating a latch release mechanism of latch assembly 83 to release striker 24 from the latch mechanism and permit subsequent movement of rear passenger door 17 to its open position. An optional lock knob 27 provides a visual indication of the locked state of closure latch assembly 83 and which may also be operable to mechanically change the locked state of latch assembly 83. A weather or door seal 29 is mounted on edge portion 23A of opening 23 in vehicle body 14 and is adapted to be resiliently compressed upon engagement with a mating sealing surface of rear passenger door 17 when the rear passenger door 17 is held by the latch mechanism of latch assembly 83 in its fully-closed position so as to provide a sealed interface therebetween which is configured to prevent entry of rain and dirt into the passenger compartment while minimizing audible wind noise, for example.

Figure 3:
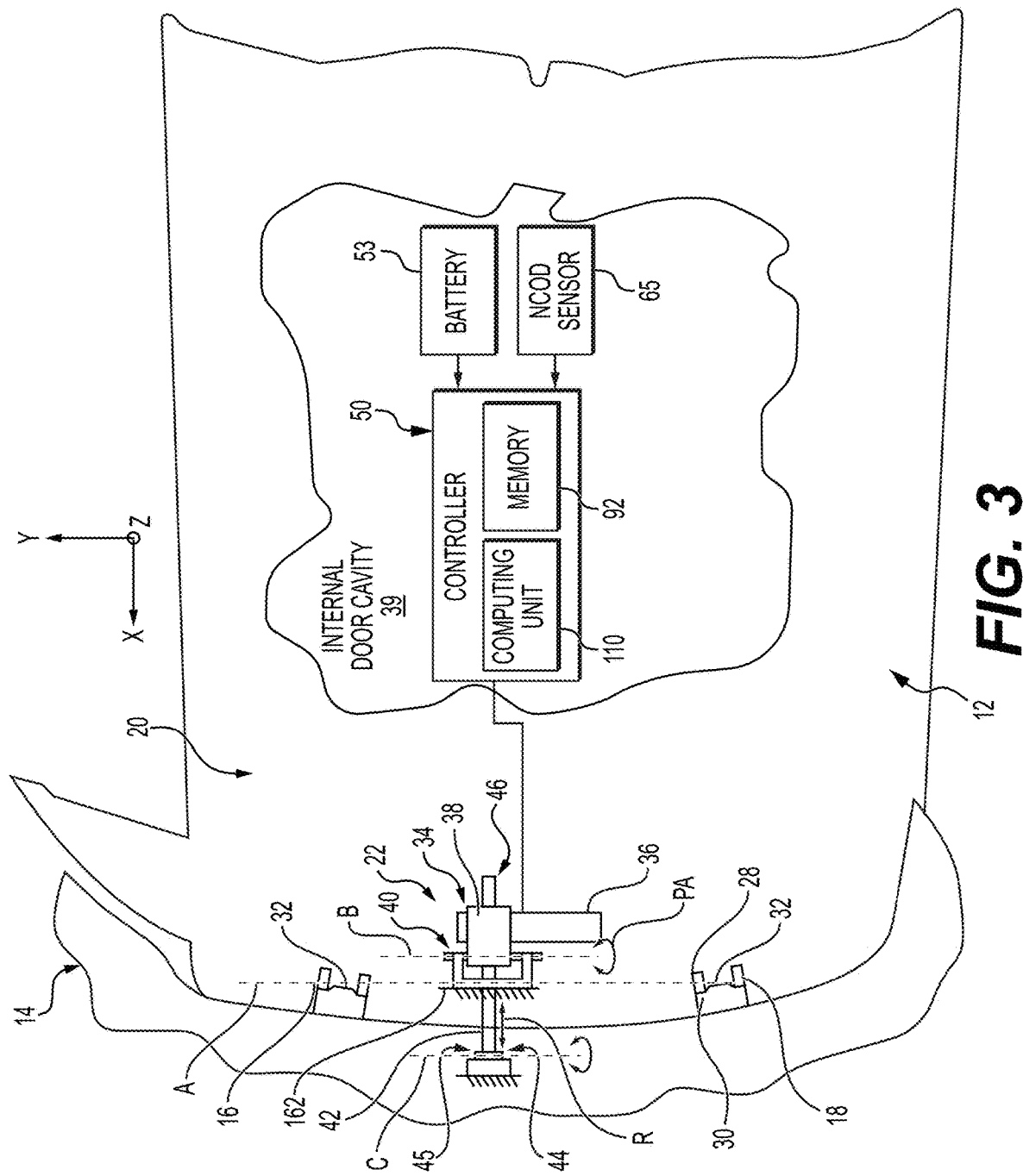
FIG. 3 is a perspective inner side view of a closure member shown in FIG. 1, with various components removed for clarity purposes only, in relation to a portion of the vehicle body and which is equipped with the power closure member actuation system, according to aspects of the disclosure.

Power closure member actuation system 20 is generally shown in FIG. 3 and, as mentioned, is operable for controllably pivoting vehicle door 12 relative to vehicle body 14 between an open position and a closed position. As shown in FIG. 3, lower hinge 18 of power closure member actuation system 20 includes a door hinge strap 28 connected to vehicle door 12 and a body hinge strap 30 connected to vehicle body 14. Door hinge strap 28 and body hinge strap 30 of lower door hinge 18 are interconnected along a generally vertically-aligned pivot axis A via a hinge pin 32 to establish the pivotable interconnection between door hinge strap 28 and body hinge strap 30. However, any other mechanism or device can be used to establish the pivotable interconnection between door hinge strap 28 and body hinge strap 30 without departing from the scope of the subject disclosure.

Still referring to FIG. 3, power closure member actuation system 20 includes the power-operated actuator mechanism 22 having a motor and geartrain assembly 34 that is rigidly connectable to vehicle door 12. Illustratively, the power closure member actuation system 20 is pivotally connected to the shut face 162 of the vehicle door 12. Motor and geartrain assembly 34 is configured to generate a rotational force about pivot axis A. In the preferred embodiment, motor and geartrain assembly 34 includes an electric motor 36 that is operatively coupled to a speed reducing/torque multiplying assembly 38, as a gearbox having one or more stages with a gear ratio allowing motor 36 and geartrain assembly 34 to generate a rotational force having a high torque output by way of a very low rotational speed of electric motor 36. However, any other arrangement of motor and geartrain assembly 34 can be used to establish the required rotational force without departing from the scope of the subject disclosure. Electrical motor 36 is controlled by electronics shown illustratively as block 50 in FIG. 3 which may include a microprocessor 110 and power electronics 92, such as H-bridge, FETS for example, controlled by the microprocessor 110. Controller 50 is electrically connected to command sources such as a door open or close switch 53, or to another controller 65 such as a Body Control Module, or an authentication controller such as PKE controller for example.

Motor and geartrain assembly 34 includes a mounting bracket 40 for establishing the connectable relationship with vehicle door 12 and the power-operated actuator mechanism 22. The connectable relationship of the power-operated actuator mechanism 22 with the vehicle door 12 via the mounting bracket 40 is illustrated as a pivotal connection to allow the power-operated actuator mechanism 22 to pivot about a pivot axis B, for example with rotations indicated as PA in FIG. 3. Mounting bracket 40 is configured to be connectable to vehicle door 12 between the upper door hinge 16 and lower hinge 18, and for example connectable to the shutface 162. Shutface 162 includes a port or aperture for allowing the drive shaft 42 to pass through the shutface 162, where such a port may be normally associated for allowing a door check link to pass therethough. As further shown in FIG. 3, this mounting of motor assembly 34 in manners as will be described herein disposes the power-operated actuator mechanism 22 of power closure member actuation system 20 in close proximity to the pivot axis B. The mounting of motor and geartrain assembly 34 adjacent to the pivot axis B of vehicle door 12 minimizes the effect that power closure member actuation system 20 may have on a mass moment of inertia (i.e., pivot axis A) of vehicle door 12, thus improving or easing movement of vehicle door 12 between its open and closed positions. Reducing the mass of the actuator and moving the mass of the actuator 22 closer to the pivot axis A reduces the mass of the door 14 and shifts the center of mass closer to the pivot axis C allowing for the motor 36 power and/or size to be reduced. In addition, as also shown in FIG. 3, the mounting of motor and geartrain assembly 34 closer to pivot axis A of vehicle door 12 allows power closure member actuation system 20 to be packaged in front of an A-pillar glass run channel and other internal door components and sheet metal panels associated with vehicle door 12 and thus avoids any interference with a glass window function of vehicle door 12. Put another way, power closure member actuation system 20 can be packaged in a portion of an internal door cavity 39 within vehicle door 12 that is not being used, and therefore reduces or eliminates impingement on existing hardware/mechanisms within vehicle door 12. Although power closure member actuation system 20 is illustrated as being mounted between the upper door hinge 16 and the lower hinge 18 of vehicle door 12, power closure member actuation system 20 can, as an alternative, also be mounted elsewhere within vehicle door 12 or even on vehicle body 14 without departing from the scope of the subject disclosure.

Power closure member actuation system 20 further includes the rotary drive mechanism that is rotatively driven by the power-operated actuator mechanism 22. As shown in FIG. 3, the rotary drive mechanism includes a drive shaft 42 interconnected to an output member of gearbox 38 of motor and geartrain assembly 34 and which extends and retracts from both sides of the gearbox 38. In addition, as an optional configuration although not expressly shown, a clutch such as a mechanical or electrical clutch may be disposed between the rotary output of gearbox 38 and first end 44 of drive shaft 42. The clutch may engage and disengage using any suitable type of clutching mechanism such as, for example, a set of sprags, rollers, a wrap-spring, friction plates, or any other suitable mechanism. The clutch may be provided to permit door 12 to be manually moved by the user between its open and closed positions relative to vehicle body 14. Such a clutch could, for example, also be located between the output of electric motor 36 and the input to gearbox 38. The location of this optional clutch may be dependent based on, among other things, whether or not gearbox 38 includes back-drivable gearing. In another possible configuration the power closure member actuation system 20 may not be provided with a clutch, which as a result reduces the mass of the power closure member actuation system 20 and of the door 14. Possibly the gearbox 38 may include "back-drivable" gearing to allow a user to manually move the door 14 whereby the gearing of the gearbox 38 will be induced to rotate. Possibly the gearbox 38 may alternatively include non-back-drivable preventing a user to manually move the door 14 whereby the gearing of the gearbox 38 cannot be induced to rotate by movement of the door 14, but rather only an activation of the motor 22 will cause the gearing of gearbox 38 to rotate to move the door 14. A brake mechanism which prevents anyone of the rotation of the motor 22, the gearbox 36, or movement of the drive shaft 42 may also not be provided with the power closure member actuation system 20 to also further reduce mass of the power closure member actuation system 20 and the door 14.

To accommodate angular motion due to swinging movement of door 12 relative to vehicle body 14, the power closure member actuation system 20 further includes a pivotal connection 45 disposed between the vehicle body 14 and the first end 44 of drive shaft 42. Second end 46 of drive shaft 42 is configured to reciprocate into and out of cavity 39 as drive shaft 42 is driven by the gearbox 38 in response to actuation of motor 36. Illustratively connection 45 is a pin and socket type connection allowing rotation of the drive shaft 42 about an axis C, which extends parallel or substantially parallel to pivot axis A of the door 12 and to the pivot axis B of the power-operated actuator mechanism 22. Translation of drive shaft 42 via operation of motor and geartrain assembly 34 functions to push the door 12 away from the vehicle body 14 when the drive shaft 42 is retracted from the cavity 39 and to pull the door 12 towards the vehicle body 14 when the drive shaft 42 is translated into the cavity 39. As a result, power closure member actuation system 20 is able to effectuate movement of vehicle door 12 between its open and closed positions by "directly" transferring a rotational force to the vehicle body 14 via linear translation of the driven drive shaft 42 in the illustrated example of FIG. 3. With motor and geartrain assembly 34 connected to vehicle door 12 adjacent to the shut face 162, second end 46 of drive shaft 42 may reciprocate and swing within cavity 39 as driven shaft 42 reciprocates R within gearbox 38. Based on available space within door cavity 39, second end 46 of drive shaft 42 may avoid collision with internal components within cavity 49 as the power-operated actuator mechanism 22 swings about axis B since for example the drive shaft 42 is retracted out of the cavity 39 as the door 12 is opened.

Figure 4:
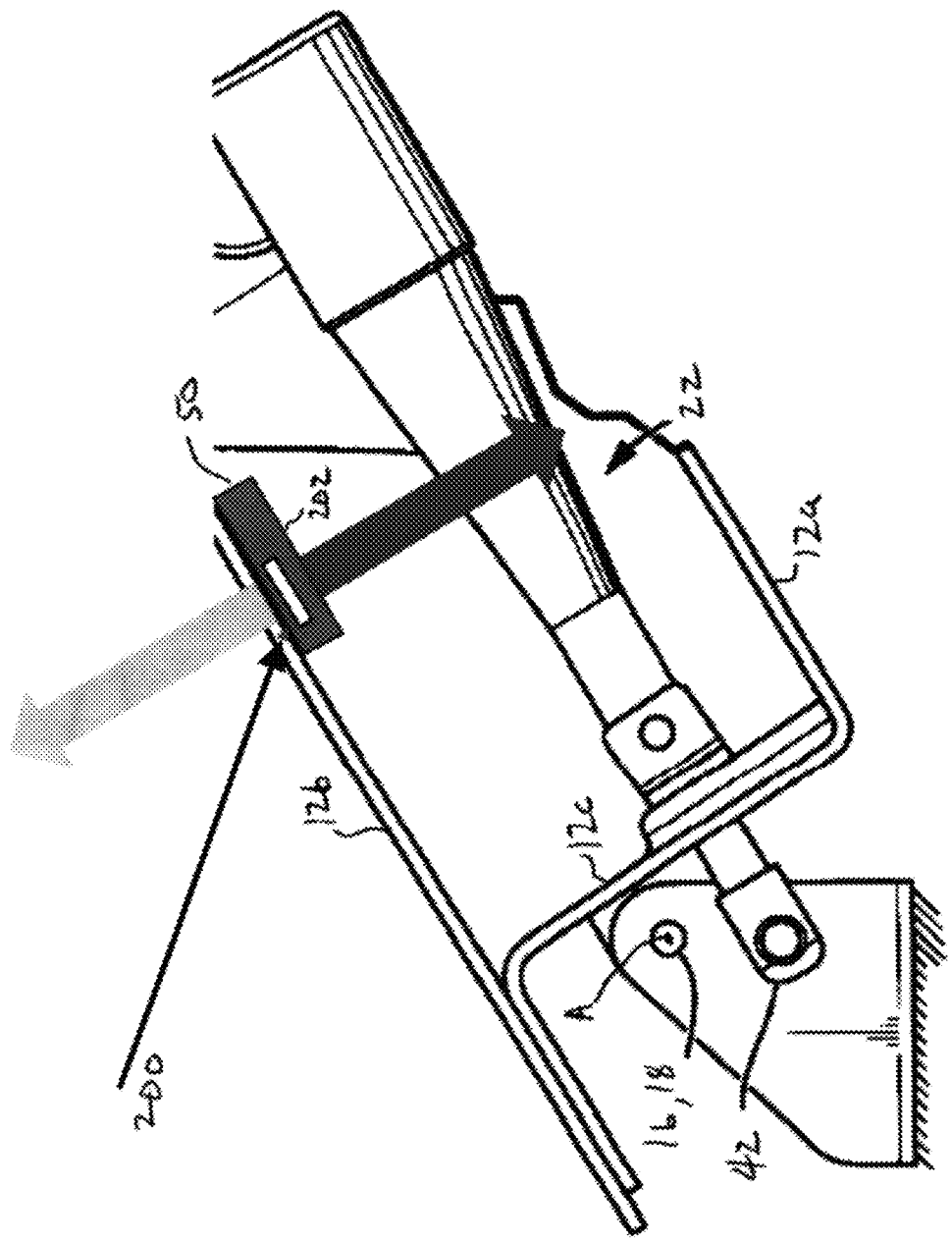
FIG. 4 shows the closure member of FIG. 3 pivotally mounted on hinges connected to a vehicle body for rotation about a pivot axis, according to aspects of the disclosure.

FIG. 4 shows the door 12 pivotally mounted on the hinges 16, 18 connected to the vehicle body 14 (not shown in its entirety) for rotation about the pivot axis A. For greater clarity, the vehicle body 14 is intended to include the 'non-moving' structural elements of the vehicle 10 such as the vehicle frame (not shown) and body panels (not shown). The door 12 includes inner and outer sheet metal panels 12a and 12b with a connecting portion 12c between the inner and outer sheet metal panels 12a and 12b. The power-operated actuator mechanism or powered actuator 22 includes the extensible actuation member or driven shaft 42 that is moveable between retracted and extended positions to effectuate swinging movement of door 12. In addition, an accelerometer 200 is mounted within a controller housing 202 of the controller 50.

Figure 5:
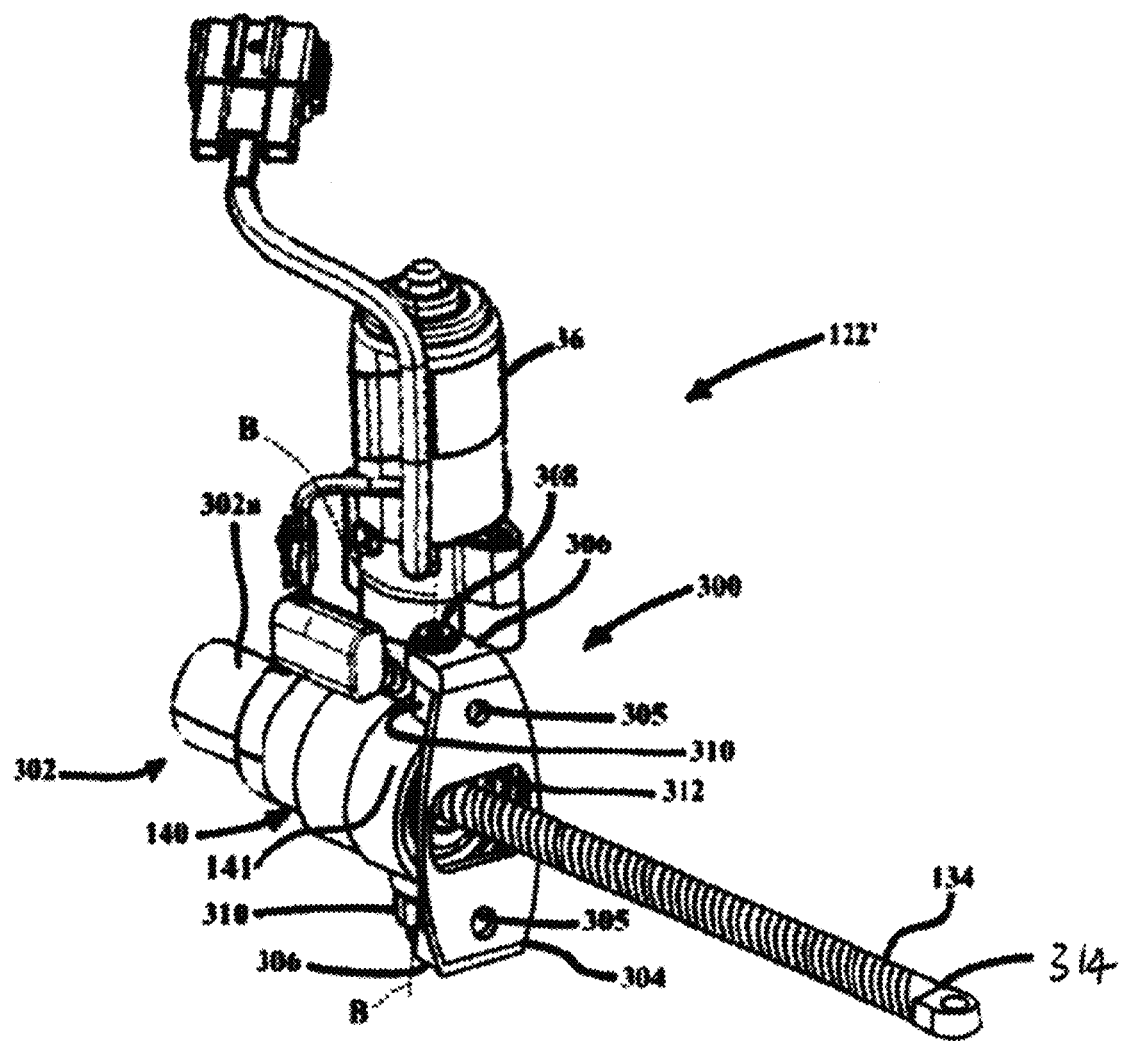
FIG. 5 illustrates a front perspective view of a powered actuator, according to aspects of the disclosure.

Now referring additionally to FIG. 5, another example powered actuator 122' is shown and includes a mounting arrangement 300 with a door adaptor bracket, also referred to as mount bracket 304, configured for pivotal attachment to gearbox 140 and for fixed attachment to closure panel 12, thereby allowing mount bracket 304 and gearbox 140, with everything operably attached to gearbox 140 including the motor 36, to pivot relative to one another. Illustratively, mount bracket 304 is configured for pivotal attachment directly to gearbox 140 to allowing movement of the gearbox 140 only to pivot about axis B. Illustratively, mount bracket 304 is configured for pivotal attachment to an outer side perimeter of the gearbox. Therefore mount bracket 304 allows for a single axis of pivoting motion of the gearbox 140 thereabout. Mount bracket 304 is shown having a plurality (pair, by way of example and without limitation) of fastener openings 305 sized for receipt of fasteners, such as threaded bolts (not shown), to facilitate fixed attachment of mount bracket 304 to closure panel 12, such as to the shut face 162. It is to be recognized that an opposite arrangement is contemplated herein, such that mount bracket 304 can be configured for fixed attachment to gearbox 140 and for pivotal attachment to closure panel 12, thereby allowing mount bracket 304, gearbox 140, and everything operably attached to gearbox 140, to pivot relative to closure panel 12. Mounting arrangement 300 is an illustrative example of a pivotal connection 45. Mounting arrangement 300 may be configured to allow the powered actuator 122' to pivot about a single axis of rotation, such as about pivot axis B. Pivot axis B is illustratively parallel to the Y axis which is aligned with the downward directional pull due to gravity. Illustratively, only a single rotational axis is provided between the powered actuator 122' and the vehicle door 12. Illustratively, mount bracket 304 is configured as a U-shaped bracket. As shown, to facilitate pivot attachment, mount bracket 304 has a pair of yokes, also referred to as ears or flanges 306, with axially aligned through openings configured for receipt of trunnions, such as can be provided by pins 308, therein. Pins 308 can be arranged for receipt in axially aligned receptacles bosses 310 extending from gearbox 140 (e.g. extending parallel to the axis B), though it is contemplated that pins could be formed as a monolithic piece of material with gearbox 140, if desired. Pins 308 provide for pivot movement of gearbox 140 relative to mount bracket 304. Flanges 306 support against movement of the gearbox 140 in the Y direction. For example lower boss 310 may be supported by bottom flange 306, and the weight of the powered actuator 122' supported thereby. Upper flange 306 may support upper boss 310 for example by the connection with the pin 308. Therefore the weight of the powered actuator 122', including the weight of the gearbox 140 and the motor 36 are transferred to the bracket 304, and not to the extensible member 134, as would be the case for example if the bosses 310 and pins 308 would be rotated ninety degrees such that pins 308 extend along a Z axis. Distributing the weight of the powered actuator 122' to the bracket 304 as opposed to the weight of the powered actuator 122', such as the weight from the gearbox 140 and/or motor 36 being supported by the extensible member 134 reduces the forces between the gearing of the gearbox 140 and the extensible member 134 which would tend to increase binding, increase friction between the nut tube and the teeth of the extensible member 134, and possibly cause flexing in the extensible member 134, which may require an increase in motor size to compensate for such forces. To allow unconfined pivot movement of gearbox 140 relative to mount bracket 304, mount bracket 304 has a clearance opening 312 therethrough. Clearance opening 312 is provided for receipt of extensible member 134 therethrough and is sized to allow free, unobstructed pivotal movement therein as closure panel or door 12 moves between its closed and open positions. Clearance opening 312 is shown to extend in the Z axis direction more so than in a Y-axis direction. Accordingly, extensible member 134 is assured of remaining in a clearance relation from mount bracket 304 as closure panel 12 is moved between the closed and open positions and as extensible member 134 translates through clearance opening 312 and pivots relative to mount bracket 304. Extensible member 134 is constrained to swing in the Z-direction only, due to the single pivot axis B.

With the ability of extensible member 134 to pivot relative to and within clearance opening 312 of mount bracket 304 about pivot B, a link bar, is not needed. As such, a distal end 314 of extensible member 134, similar to first end, can be pivotally fixed directly to vehicle body 14, with distal end 314 having an attachment through opening 136. As a result, the gearbox 140 and components attached thereto, including electric motor 36, can be moved immediately adjacent shut face 162, thereby providing reduced moment variations and enhanced haptic/servo control responses, particularly since the moment arm does not vary as closure panel 12 moves between the closed and open positions. Furthermore, by eliminating an additional axis of pivoting associated with the pivotal connection between the powered actuator 122' and the shutface 162, such as an axis of rotation extending in the Z direction and providing only a single axis of rotation, such as axis of rotation B, additional complex pivotal coupling configurations can be avoided which further eliminates distance creating components between the shutface 162 and the gearbox 140, reduces the mass of the powered actuator 122', and allows the mass of the powered actuator 122' to be brought closer to the door pivot axis C. Motor 36 size can be therefore reduced, the braking ability and response time of the motor 36 can be improved due to less mass generating inertia away from the pivot axis C. Furthermore, providing a gearbox 140 as a structural support for other components reduces the binding of the extensible member 134 with the gearing of the gear box 140, as well as other loading on the gears of the gear box 140 since all the gearing is supported by load bearings as described herein.

Figure 6:
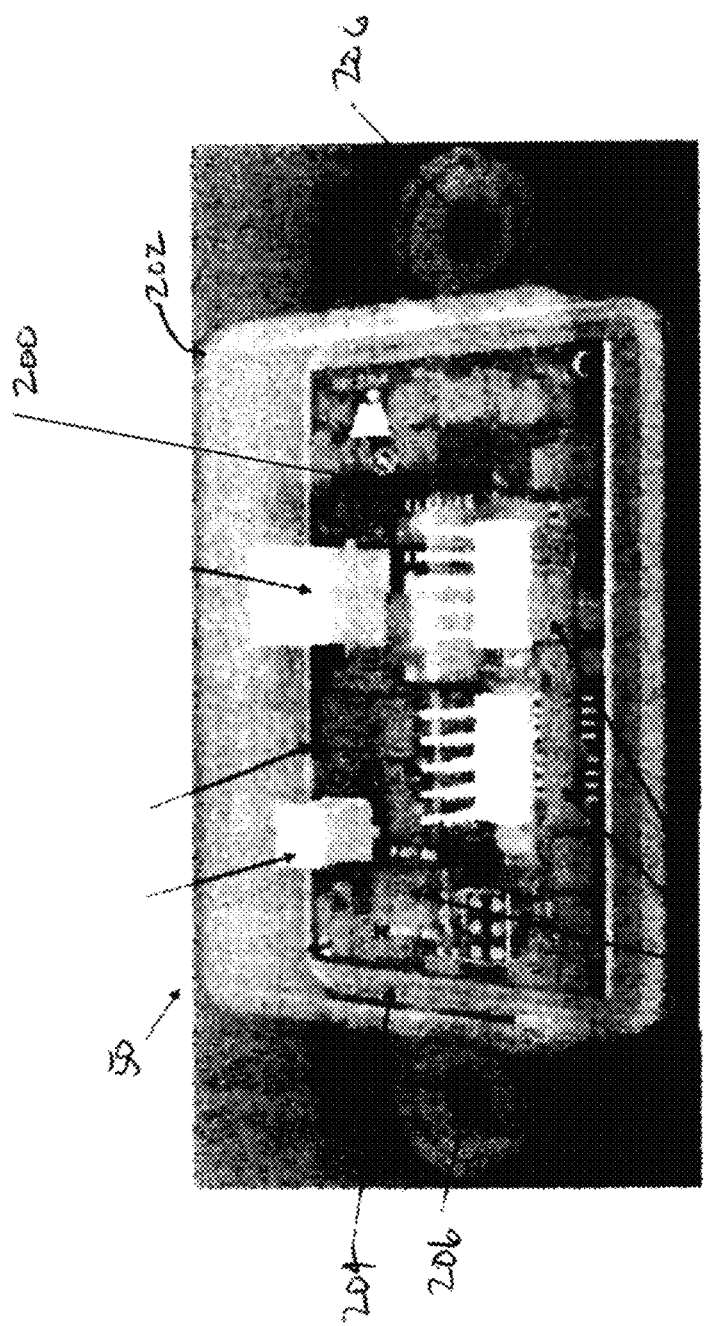
FIG. 6 shows another view of the accelerometer in the controller housing

FIG. 6 shows another view of the accelerometer in the controller housing 202. Specifically, the accelerometer can comprise a chip mounted to a controller printed circuit board 204 (e.g., along with the microprocessor 110 and power electronics 92, such as H-bridge, FETS, for example). The controller housing 202 may also include mounting holes 206, as shown (e.g., for attaching the controller housing 202 to the door 12).

Figure 7:
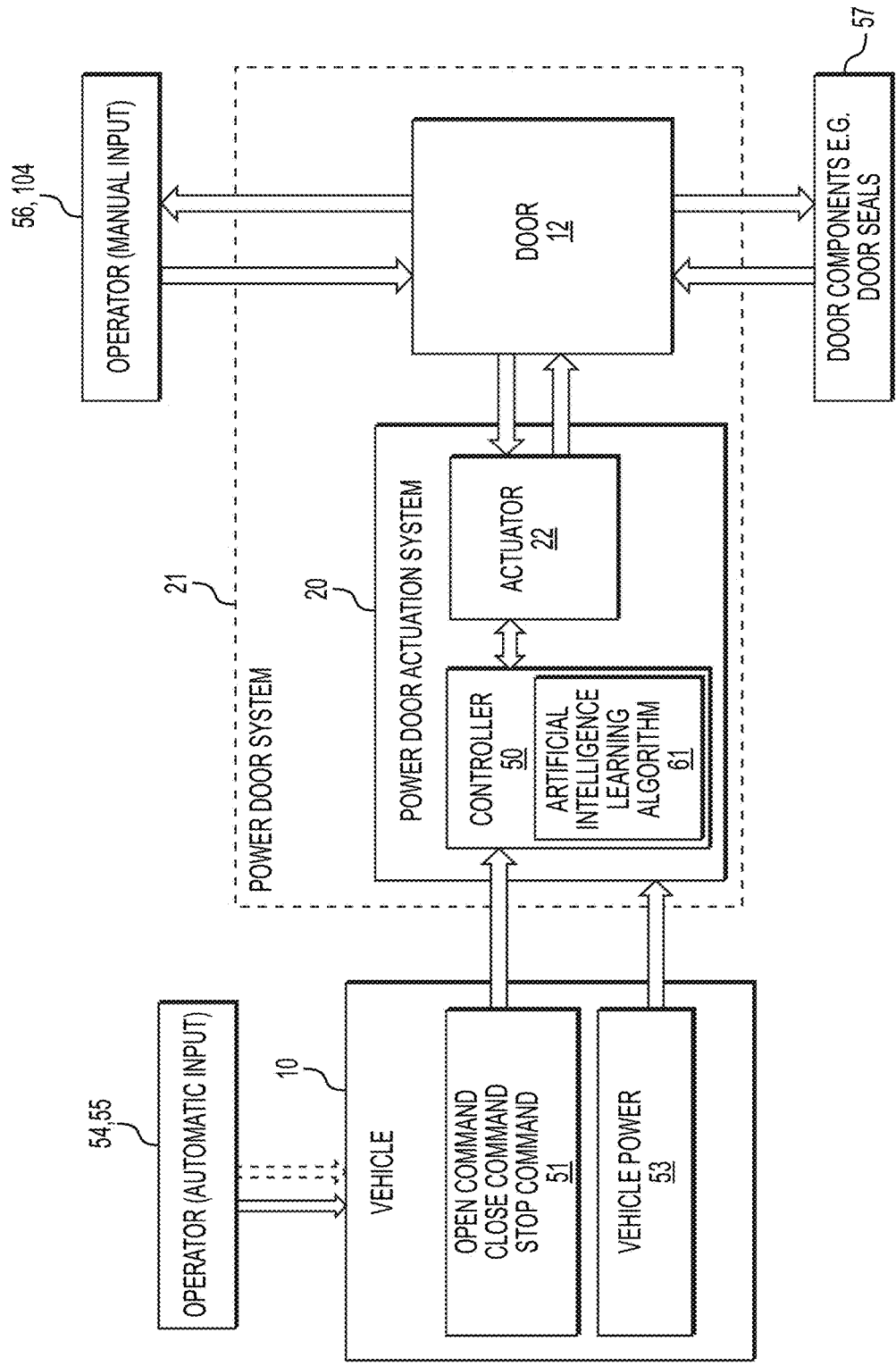
FIG. 7 illustrates a block diagram of the power closure member actuation system, according to aspects of the disclosure.

FIG. 7 illustrates a block diagram of a power door system 21 including the power closure member actuation system 20 for moving the closure member (e.g., vehicle door 12) of the vehicle 10 between open and closed positions relative to the vehicle body 14. As discussed above, the power closure member actuation system 20 includes the actuator 22 that is coupled to the closure member (e.g., vehicle door 12) and the vehicle body 14. The actuator 22 is configured to move the closure member 12 relative to the vehicle body 14. The power closure member actuation system 20 also includes the controller or actuator controller 50 that is coupled to the actuator 22 and in communication with other vehicle systems (e.g., a door node control module 52 or a body control module (BCM)) and also receives vehicle power from the vehicle 10 (e.g., from a vehicle battery 53).

The actuator controller 50 is operable in at least one of an automatic mode (in response to an automatic mode initiation input 54) and a powered assist mode (in response to a motion input 56). In the automatic mode, the actuator controller 50 commands movement of the closure member through a predetermined motion profile (e.g., to open the closure member). The powered assist mode is different than the automatic mode in that the motion input 56 from the user 75 may be continuous to move the closure member, as opposed to a singular input by the user 75 in automatic mode. Actuator controller 50 may therefore be configured as a servo controller which may for example receive electrical signals indicative of the position of the door from the closure member actuation system 20, such as a high position count sensor as will be described in more details herein below as an illustrative example, and in response send electrical signals to the actuator 22 based on the received high position count signals to move the door closure member 12. No separate button or switch activations by a user are needed to move the closure member 12, the user only requires to directly move the closure member 12. Commands 51 from the vehicle systems may, for example, include instructions the actuator controller 50 to open the closure member, close the closure member, or stop motion of the closure member. Such control inputs, such as inputs 54, 56 may also include other types of inputs 55, such as an input from a body control module, which may receive a wireless command to control the door opening based on a signal such as a wireless signal received from the key fob 60, or other wireless device such as a cellular smart phone, or from a sensor assembly provided on the vehicle, such as a radar or optical sensor assembly detecting an approach of a user, such as a gesture or gait e.g. walk of the user 75 upon approach of the user 75 to the vehicle. Also shown are other components that may have an impact on the operation of the power closure member actuation system 20, such as door seals 57 of the vehicle door 12, for example. In addition, environmental conditions 59 (rain, cold, heat, etc.) may be monitored by the vehicle 10 (e.g., by the body control module 52) and/or the actuator controller 50. The actuator controller 50 also includes an artificial intelligence learning algorithm 61 (e.g., series of nodes forming a neural network model), discussed in more detail below.

Figure 8:
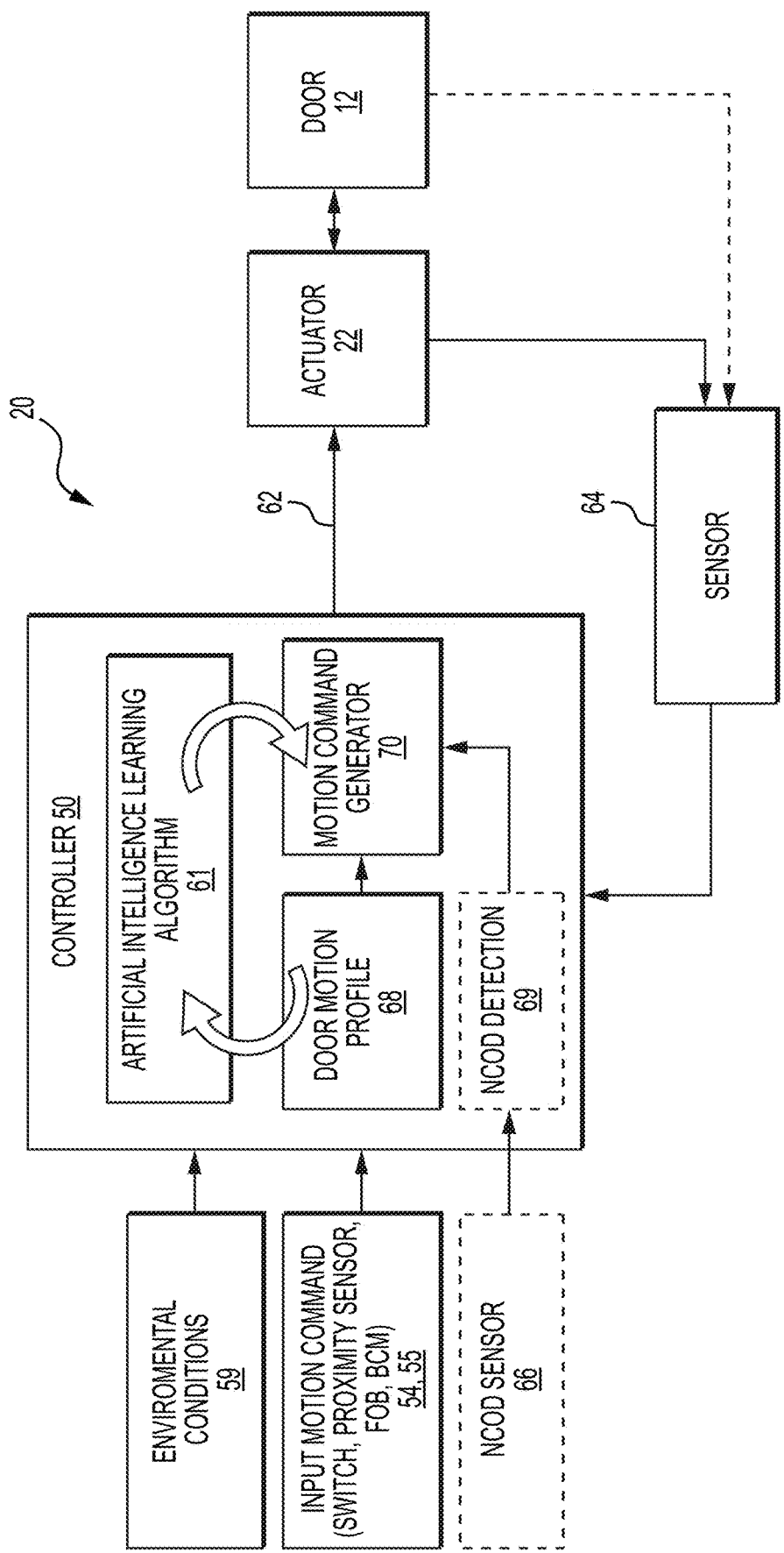
FIG. 8 illustrates another block diagram of the power closure member actuation system for moving the closure member in an automatic mode, according to aspects of the disclosure.

Referring now to FIG. 8, the actuator controller 50 is configured to receive the automatic mode initiation input 54 and enter the automatic mode to output a motion command 62 in response to receiving the automatic mode initiation input 54 or input motion command 62. The automatic mode initiation input 54 can be a manual input on the closure member itself or an indirect input to the vehicle (e.g., closure member switch 58 on the closure member, switch on a key fob 60, etc.). So, the automatic mode initiation input 54 may, for example, be a result of a user or operator operating a switch (e.g., the closure member switch 58), making a gesture near the vehicle 10, or possessing a key fob 60 near the vehicle 10, for example. It should also be appreciated that other automatic mode initiation inputs 54 are contemplated, such as, but not limited to a proximity of the user 75 detected by a proximity sensor.

In addition, the power closure member actuation system 20 includes at least one closure member feedback sensor 64 for determining at least one of a position and a speed and an attitude of the closure member. Thus, the at least one closure member feedback sensor 64 detects signals from either the actuator 22 by counting revolutions of the electric motor 36, absolute position of an extensible member (not shown), or from the door 12 (e.g., an absolute position sensor on a door check as an example) can provide position information to the actuator controller 50. Feedback sensor 64 in communication with actuator controller 50 is illustrative of part of a feedback system or motion sensing system for detecting motion of the door directly or indirectly, such as by detecting changes in speed and position of the closure member, or components coupled thereto. For example, the motion sensing system may be hardware based (e.g. a hall sensor unit an related circuitry) for detecting movement of a target on the closure member (e.g. on the hinge) or actuator 22 (e.g. on a motor shaft) as examples, and/or may also be software based (e.g. using code and logic for executing a ripple counting algorithm) executed by the actuator controller 50 for example. Other types of position, speed, and/or orientation detectors such as accelerometers and induction based sensors may be employed without limitation.

The power closure member actuation system 20 additionally includes at least one non-contact obstacle detection sensor 66 which may form part of a non-contact obstacle detection system coupled, such as electrically coupled, to the actuator controller 50. The actuator controller 50 is configured to determine whether an obstacle is detected using the at least one non-contact obstacle detection sensor 66 (e.g., using a non-contact obstacle detection algorithm 69) and may, for example, cease movement of the closure member in response to determining that the obstacle is detected. The non-contact obstacle detection system may also be configured to calculate distance from the closure member to the object or obstacle, or to a user as the object or obstacle, to the door 12. For example non-contact obstacle detection system may be configured to perform time of flight calculations to determine distance using a radar based sensor 66 or to characterize the object as a user or human as compared to an non-human object for example based on determining the reflectivity of the object using a radar based sensor 66 and system. The non-contact obstacle detection system may also be configured determine when an obstacle is detected, for example by detecting reflected waves of the object or obstacle or user of radar transmitted from the obstacle sensor 66. The non-contact obstacle detection system may also be configured determine when an obstacle is not detected, for example by not detecting reflected waves of the object or obstacle or user of radar transmitted from the obstacle sensor 66. The operation and example of the at least one non-contact obstacle detection sensor 66 and system are discussed in U.S. Patent Application No. 2018/0238099, incorporated herein by reference.

In the automatic mode, the actuator controller 50 can include one or more closure member motion profiles 68 that are utilized by the actuator controller 50 when generating the motion command 62 (e.g., using a motion command generator 70 of the actuator controller 50) in view of the obstacle detection by the at least one non-contact obstacle detection sensor 66. So, in the automatic mode, the motion command 62 has a specified motion profile 68 (e.g., acceleration curve, velocity curve, deceleration curve, and finally stops at an open position) and is continually optimized per user feedback (e.g., automatic mode initiation input 54).

Figure 9:
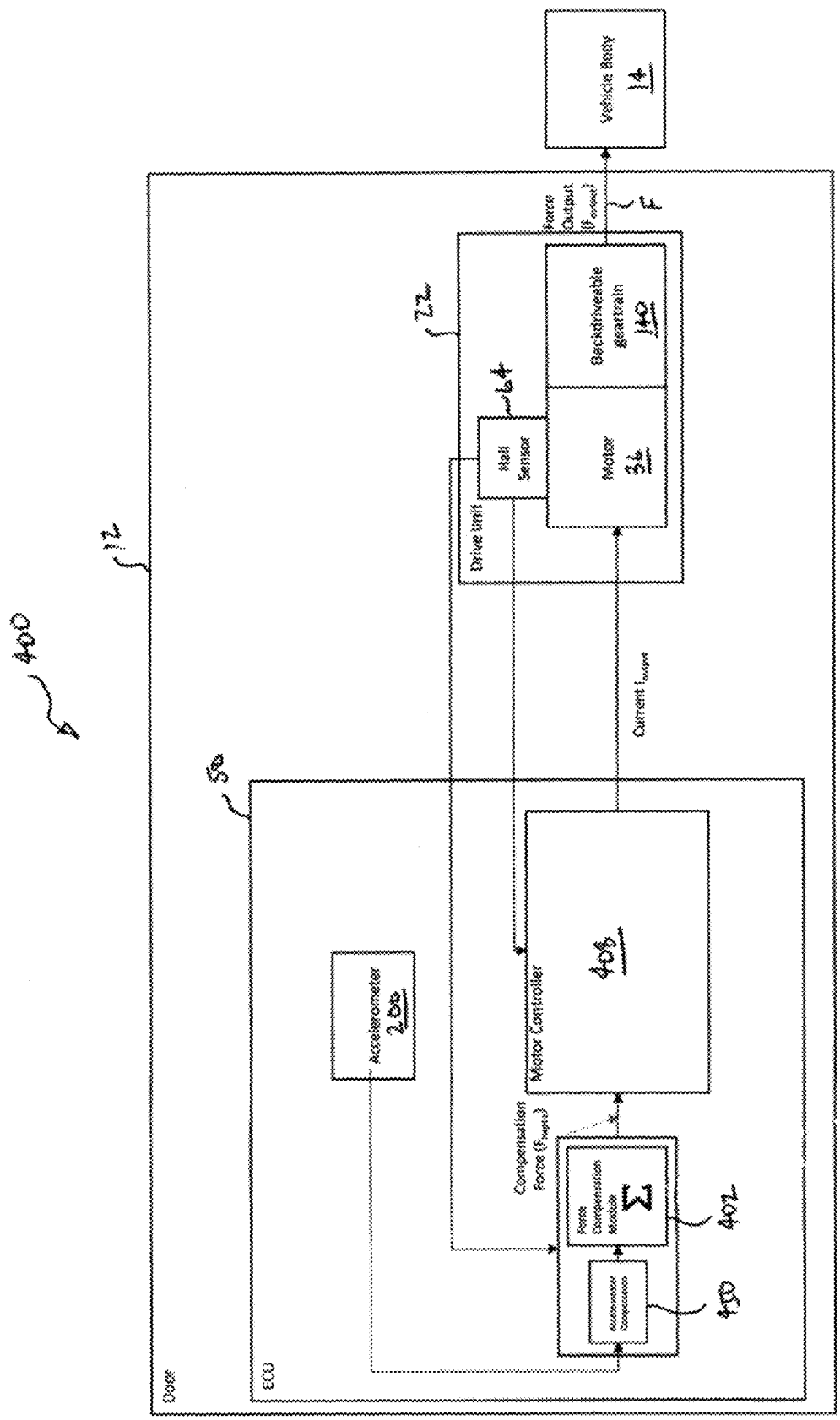
FIGS. 9 and 10 are block diagrams of a motor control system for controlling motion of the door, in accordance with aspects of the disclosure.
Figure 10:
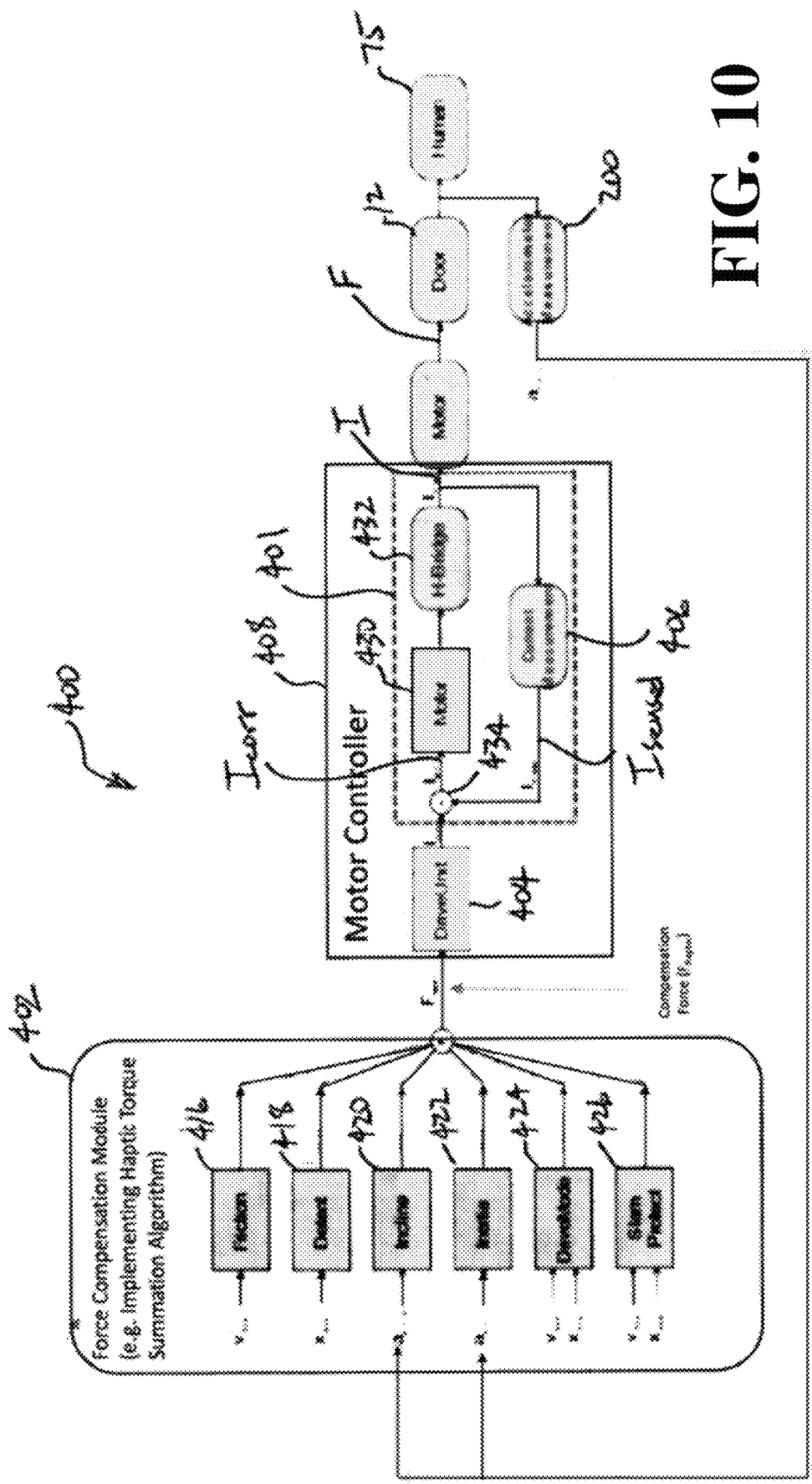

FIGS. 9 and 10 are block diagrams of a motor control system 400 for controlling motion of the door 12. The system 400 can include the motor 36 for moving the door 12. The system 400 can also include a closed loop current control system 401 (FIG. 10) controlling the drive current I provided to the motor 36 for controlling the motor 36 to apply a torque or force F to the door 12. The system 400 also includes a force compensation module or haptic control algorithm 402 configured for calculating a compensation force $F_{haptic}$ to be provided to the closed loop current control system 401. According to an aspect, the force compensation module or haptic control algorithm 402 is based on a superposition principle of torques. The closed loop current control system 401 controls the drive current I based on the compensation force $F_{haptic}$.

Haptic control algorithm 402 is an example module configured for providing, such as by calculating, a compensation value or factor, such as a torque value, a current value, or a force value as but non-limiting examples, to compensate or negate, either partially, substantially or wholly negate, for external influences acting on the motion of the door 12. A drive unit 404 (FIG. 10) may be provided that is configured to convert the torque value outputted by the haptic control algorithm 402 into a target current $I_{target}$ for input into the closed loop current feedback motor control system 401. An example of the haptic control algorithm 402 is described in WO2021081664A1 entitled "Powered door unit optimized for servo control", the entire contents of which are incorporated herein by reference. In a possible configuration control system 301 may be provided as an integral unit with the motor controller 408.

So, closed loop current feedback motor control system 401, haptic control algorithm 402, drive unit 404, and motor 36 may work together as part of the motor control system 400. In more detail, the system 400 can include the motor 36 for moving the door 12. The system 400 can also include the closed loop current control system 401 controlling the drive current I provided to the motor 36 for controlling the motor 36 to apply the force F to the door 12. The system 300 also includes the haptic control algorithm 402 configured for calculating the compensation force $F_{haptic}$ to be provided to the closed loop current control system 401. The closed loop current control system 401 controls the drive current I based on the compensation force $F_{haptic}$.

Controlling the motor 36 using a closed loop current feedback motor control system 401 receiving a control command calculated based on torque values improves the performance of the door control by the motor 36. Since the drive current I provided to the motor 36 is controlled via the closed loop feedback system 401, and since drive current I is proportional to motor torque output T and the force F (or alternatively considering from a reference point of a user causing a torque input on the motor 36 via the user moving the door 12, whereby the motor 36 will act as a torque input generator to proportionally modify the drive current I).

The system 400 also includes various sensors provided to the various control blocks of the system 400. More specifically, the system 400 also includes a current sensor 406 for detecting a sensed current $I_{sensed}$ flowing in the motor 36. The haptic control algorithm 401 is further configured to receive the sensed current $I_{sensed}$ and calculate the compensation force $F_{haptic}$. Thus, the current sensor 406 providing accurate torque values to the haptic control algorithm and an accelerometer 200 (and door position sensors 64 discussed above and in more detail below) are provided for operating the closed loop current feedback motor control system 401.

Specifically, the accelerometer 200 may provide more sensitive sensing of door motion, while the door position sensors 64 may be provided to offer reliability of door position and motion to the system 50. In other words, an accelerometer sensitivity of the accelerometer 200 is greater than a position sensitivity of a door position sensor 64, such that the accelerometer 200 detects motion that is not detectable by the door position sensor 64. Therefore, different sensors may provide accurate, reliable, and sensitive data for providing feedback of motion of the door 12 in control system 400.

So, the force based control of the motor 36 will be improved by using the current sensor 406 (e.g., a shunt resistor configuration) detecting the current from the motor 36 through the return feedback branch of closed loop current feedback motor control system 401 for example, directly measuring the current running through the motor 36 as modified by the user pushing on the door 12 to cause the motor 36 to act as a generator provides a derivable torque value for use by the haptic control algorithm 402. By monitoring the drive current I directly, the haptic control algorithm 402 can be inputted a precise input torque (via the proportional to the sensed current $I_{sensed}$) applied by the user on the door 12. Compared to other types of sensors such as door position sensors or accelerometer 200, such sensors cannot detect the force input on the door 12 and would require a transfer function to translate the position or motion signals into an approximate force value. By detecting the sensed current $I_{sensed}$ flowing through the motor 36, since such drive current I is proportional to the torque T of the motor 36, such detected or sensed current $I_{sensed}$ can be fed back to the haptic control algorithm 402 to modify the compensation force $F_{haptic}$ to be provided to the drive unit 404. Since the haptic control algorithm 402 performs calculations in terms of torque values, and the detect motor current can be easily translated into torque values to be used by the haptic control algorithm 402, other sensors such as position sensors, accelerometer 200 in comparison which require complex conversions from position/velocity/acceleration data into torque, may also further be unable to provide data or accurate data to extract force acting on the door 12 for use by the haptic control algorithm 402. Therefore, using a closed loop current feedback motor control system 401 where the current in the feedback line from the motor 36 is sensed to be used by the haptic control algorithm 402 to provide data that is correlated to the exact torque the user is applying to the door 12, results in a precise compensation force $F_{haptic}$ from the haptic control algorithm 402 to be supplied to the drive unit 404 which the closed loop current feedback motor control system 401 will in turn use to adjust the motor torque acting on the door 12 and which will be sensed by the user. Therefore the force of the user acting on the door 12 can be precisely compensated by the haptic control algorithm 402 since the user's force can be precisely detected by detecting the motor current.

Referring specifically to FIG. 10, the accelerometer 200 provides an acceleration signal $a_{x,y,z}$ to at least one of the closed loop current control system 401 and the haptic control algorithm 402. The haptic control algorithm 402 includes a summation of a plurality of forces from a plurality of force calculations 416, 418, 420, 422, 424, 426, 428 by a summer 414 that outputs the compensation force $F_{haptic}$ to the drive unit 404. In other words, the haptic control algorithm 402 calculates a target torque as a control parameter to the drive unit 404 to be applied by the drive unit 404 on the closure member (e.g., door 12) to compensate for external environmental factors influencing the position of the door 12. The plurality of force calculations include a friction force calculation 416 that receives a velocity of the closure member or door $v_{door}$ and outputs a friction force $F_{friction}$, a detent force calculation 418 that receives a position of the door $x_{door}$ and outputs a detent force $F_{detent}$, an incline force calculation 420 that receives the acceleration signal $a_{x,y,z}$ and outputs an incline force $F_{incline}$, an inertia force calculation 422 that receives the acceleration signal $a_{x,y,z}$ and outputs an inertia force $F_{inertia}$, a drive mode force calculation 424 that receives the position of the door $x_{door}$ and the velocity of the door $v_{door}$ and outputs a drive mode force $F_{drivemode}$, a slam protect force calculation 426 that receives the position of the door $x_{door}$ and the velocity of the door $v_{door}$ and outputs a slam protect force $F_{slamprotect}$, and a user input torque force calculation 428 that receives the sensed current $I_{sensed}$ from the current sensor 406 and outputs a user input torque force $F_{userinput}$. According to an aspect, the acceleration signal $a_{x,y,z}$ sent to the incline force calculation 420 and the inertia force calculation 422 may be adjusted before being used by the incline force calculation 420 and the inertia force calculation 422.

The motor controller 408 is shown illustratively as adapted to compensate for internal influences acting on the motion of the door 12. Internal influences may include effects on door motion attributed or originating from the powered actuator 22, 122', which may include but not be limited to grain train such as gearbox (backlash reactions, differences in operation between a back driven direction and a forward driven direction of the powered actuator 22, 122'), internal friction due to gearing or bushing types, moment variations due to connection points of the powered actuator 22, 122' with the vehicle body and/or vehicle door, a flex coupling, a spindle/nut interface, where such effects tend to result in door motion differences in expected door motion and actual door motion due to the powered actuator 22, 122' not outputting a target force value, for example received from the output of the haptic control algorithm 302 e.g. powered actuator 22, 122' does not cause a compensation force $F_{haptic}$ to be applied to the door 12 as force F. Motor controller 308 is therefore configured to generate a control signal provided to the motor 36 that is varied to counteract any internal influences or effects attributed to the power side door actuator 22, 122'. Therefore the system 400 for controlling the motion of a door 12 is provided that illustratively includes a power side door actuator 22, 1221 comprising a motor 36 for generating a output force for moving the door 12, and a motor controller for controlling the motor 36 at a compensation force $F_{haptic}$, wherein the motor controller is adapted to compensate for effects associated with the power side door actuator 22, 122' that vary the force output F of the motor 36 compared to the compensation force $F_{haptic}$. For example, if the motor 36 is intended to be controlled using a compensation force $F_{haptic}$ equal to 10 newtons such that 10 newtons in force is expected to be applied to the door 12, and the power side door actuator 22, 122' has an effect tending to cause a difference between the force command value and the actual force output, for example due to internal friction causing the actual motor output F to be reduced by 0.5 newtons, the controller is adapted to adjust the compensation force $F_{haptic}$ from 10 newtons to 10.5 newtons, such that the output motor force is equal to the expected output force acting on the door of 10 Newtons (10.5 Newtons-0.5 Newtons). As another example due to power side door actuator 22, 122' operating inefficiencies due to back drive operation and forward drive operational differences (for example due to the geartrain), requiring the motor 36 to be operated differently when controlled in either the backdrive direction or the forward drive direction as determined by block 438, the controller, for example drive unit 404 is adapted to adjust the compensation force $F_{haptic}$ to overcome to overcome the loss of efficiency when the power side door actuator 22, 122' is operated in the back drive direction, such that actual motor output (i.e., force F) matches compensation force $F_{haptic}$.

The closed loop current control system 301 includes a motor block 430 connected to an H-bridge block 432. A subtractor 434 subtracts the sensed current $I_{sensed}$ from the current sensor 406 from the target current $I_{target}$ to output a corrected current $I_{corr}$ to the motor block 430. The motor block 430 and H-bridge block 432 are configured to convert the corrected current $I_{corr}$ to the drive current I which is sensed by the current sensor 406.

Figure 11A:
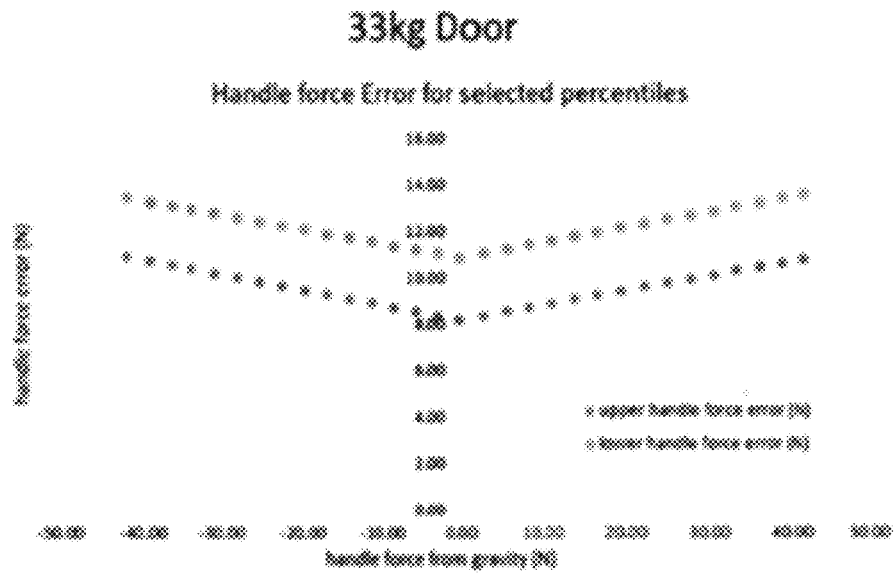
FIGS. 11A and 11B show plots of a handle force error versus a handle force from gravity for a traditional door and a heavy door without any accelerometer calibration.
Figure 11B:
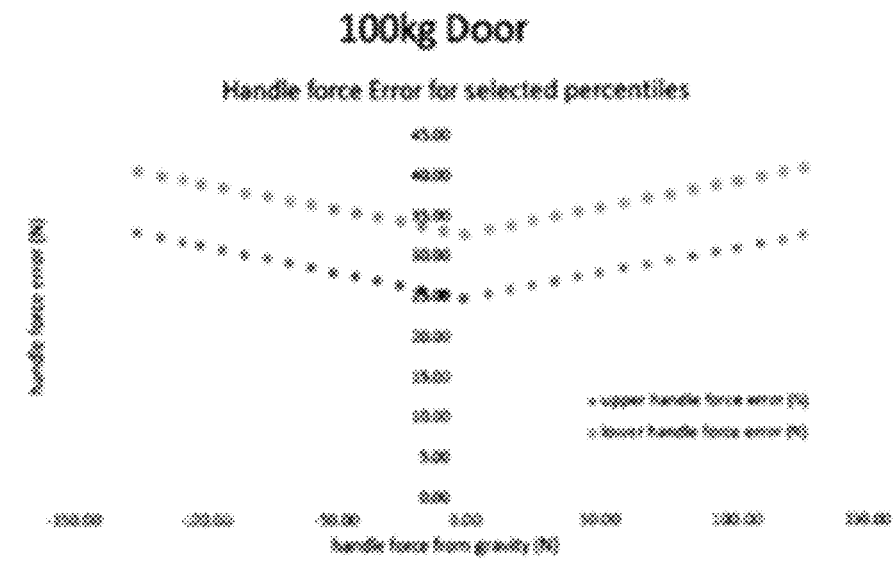

The accelerometer 200 itself may have a basic calibration from the supplier of the accelerometer 200, however, there is usually still some error that is still present in the accelerometer 200 (i.e., the integrated circuit itself). FIGS. 11A and 11B show plots of a handle force error versus a handle force from gravity in Newtons (N) for a traditional door and a heavy door without any accelerometer calibration. As shown, if there was no calibration of the accelerometer at all, the handle force error could be as large as 14N for the traditional door (33 kg) or as high as 40N for the heavy door (100 kg). These force errors can easily be noticed by the user 75 and can even cause the door 12 to fall open or closed. These forces are even more noticeable when the door 12 is calibrated to be light (i.e., in the powered assist mode).

Consequently, the system 400 can include an accelerometer compensation module 450 of the controller 50 configured to adjust the accelerometer signal $a_{x,y,z}$ before the accelerometer signal $a_{x,y,z}$ is used by the incline force calculation 420 and the inertia force calculation 422 of the haptic control algorithm 402. So, the accelerometer 200 senses movement of the closure member 12 and outputs the accelerometer signal $a_{x,y,z}$ corresponding to the movement sensed. The actuator controller 50 is configured to detect the movement of the closure member 12 using the accelerometer 200. The actuator controller 50 determine an adjusted accelerometer signal $A_{adjusted}$ as the accelerometer signal $a_{x,y,z}$ adjusted using one of a plurality of predetermined compensation factors determined through an accelerometer calibration process or method. According to an aspect, the accelerometer calibration process occurs temporally before installation of the accelerometer 200 in the vehicle 10. The actuator controller then controls the opening or closing of the closure member 12 using the electric motor 36 based on the movement of the closure member 12 as represented by the adjusted accelerometer signal.

Figure 12A:
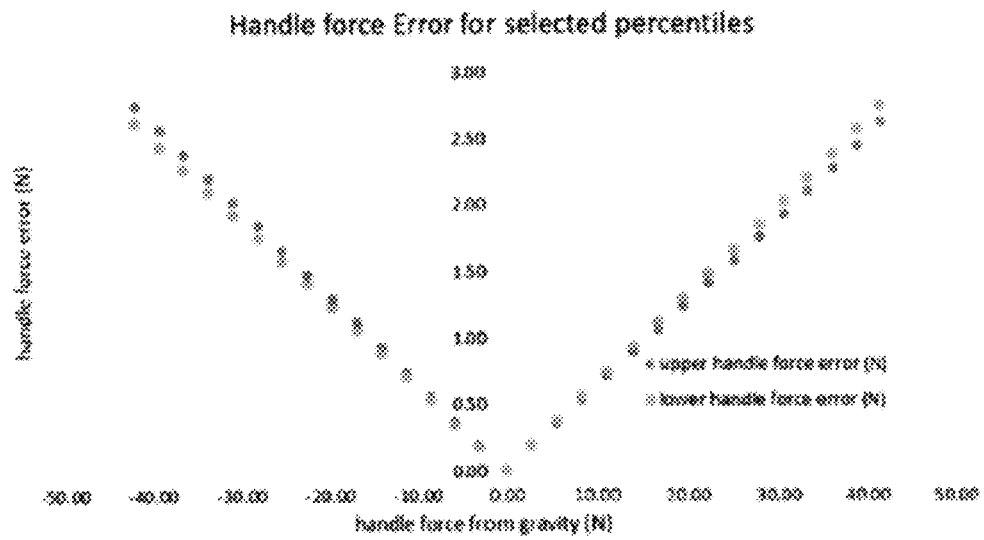
FIGS. 12A and 12B show plots of the handle force error versus a handle force from gravity for the traditional door and the heavy door following an accelerometer calibration in only one orientation, in accordance with aspects of the disclosure.
Figure 12B:
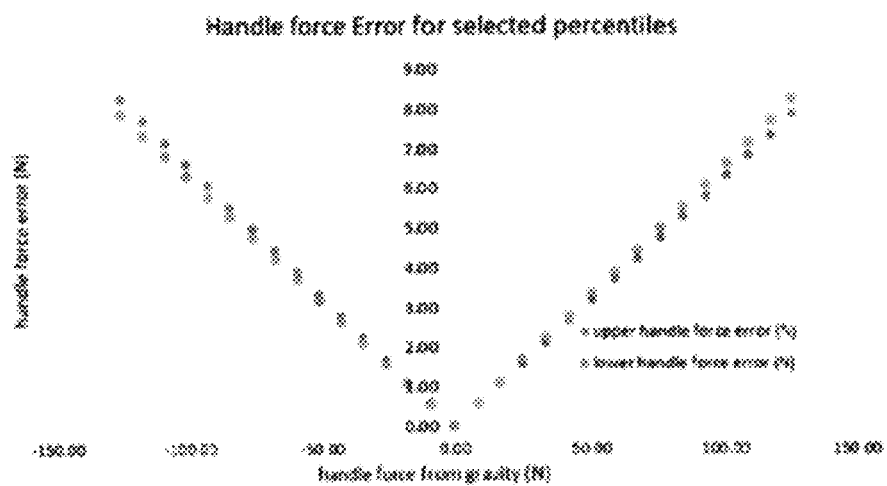

FIGS. 12A and 12B show plots of the handle force error versus a handle force from gravity in Newtons for the traditional door and the heavy door following an accelerometer calibration in only one orientation. As shown, if there was a single orientation calibration, the error for the traditional 33 kg door would be up to 2.7N and the heavy 100 kg door would be up to 8N. These force errors are still not within an acceptable range. These errors may not be distinguishable for doors 12 that are calibrated to be heavy. But will be distinguishable for doors 12 that are calibrated to be light.

Figure 13A:
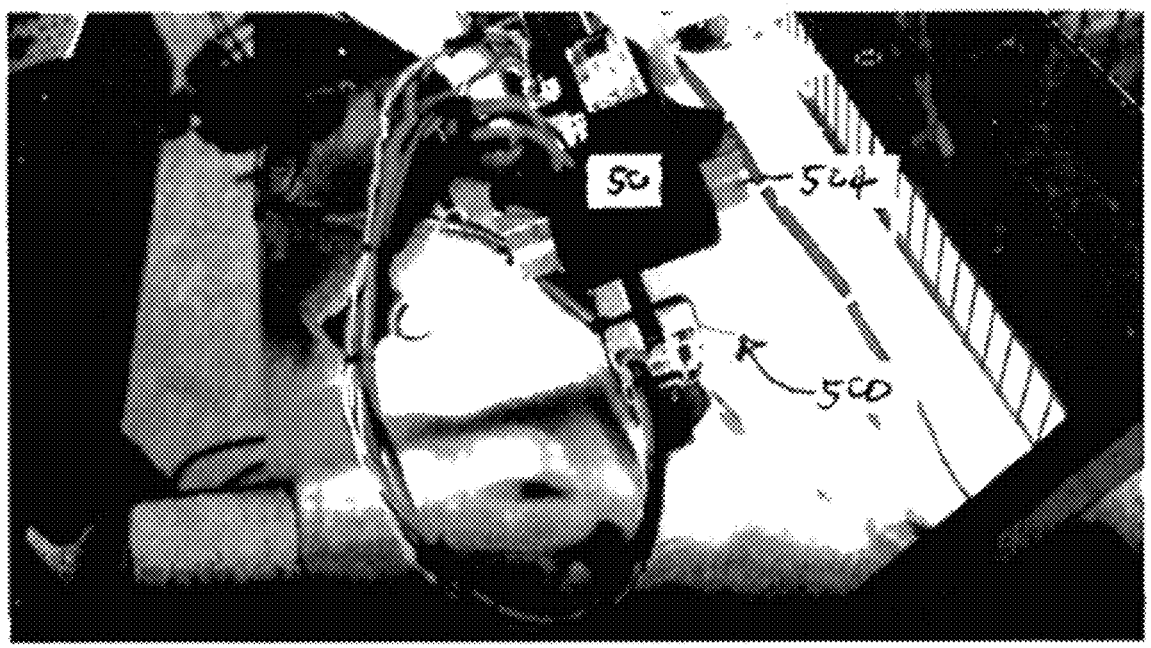
FIGS. 13A and 13B show an example calibration fixture in operation during an accelerometer calibration process of the accelerometer, in accordance with aspects of the disclosure.
Figure 13B:
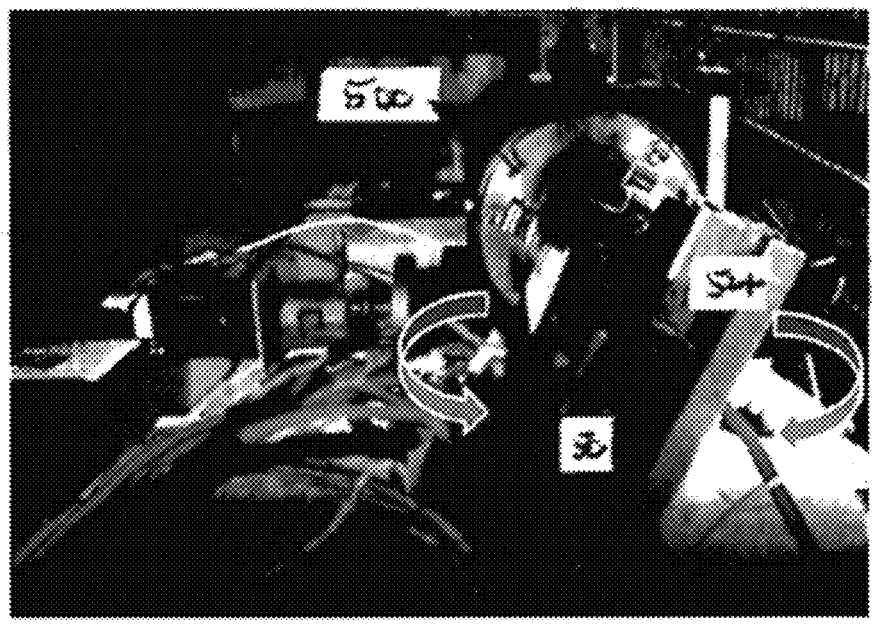

As a result, the accelerometer calibration process disclosed herein includes orienting the accelerometer 200 in each of a plurality of angles relative to a starting position and simultaneously comparing the accelerometer signal $a_{x,y,z}$ obtained when the accelerometer 200 is oriented at each of the plurality of angles with a predetermined expected accelerometer signal for each of the plurality of angles. These angles can vary depending on the application, however, an example of these angles could be −45, −12, −8, −4, 0, 4, 8, 12, 45 degrees. FIGS. 13A and 13B show an example calibration fixture 500 in operation during an accelerometer calibration process of the accelerometer 200. Calibrating the accelerometer 200 is performed once the accelerometer 200 is mounted in the controller housing 202 or the controller 50. The calibration fixture 500 includes a stepper motor 502 operably coupled to a mounting platform 504 supporting the controller 50. The stepper motor 502 is configured to move the mounting platform 504 and the actuator housing 202 of the actuator controller 50 (and the accelerometer 200) to each of the plurality of angles starting with the starting position. So, the stepper motor 502 rotates the controllers 50. According to an aspect, 18 measurements are taken. The calibration process takes roughly 1 minute to complete per controller 50.

Figure 14:
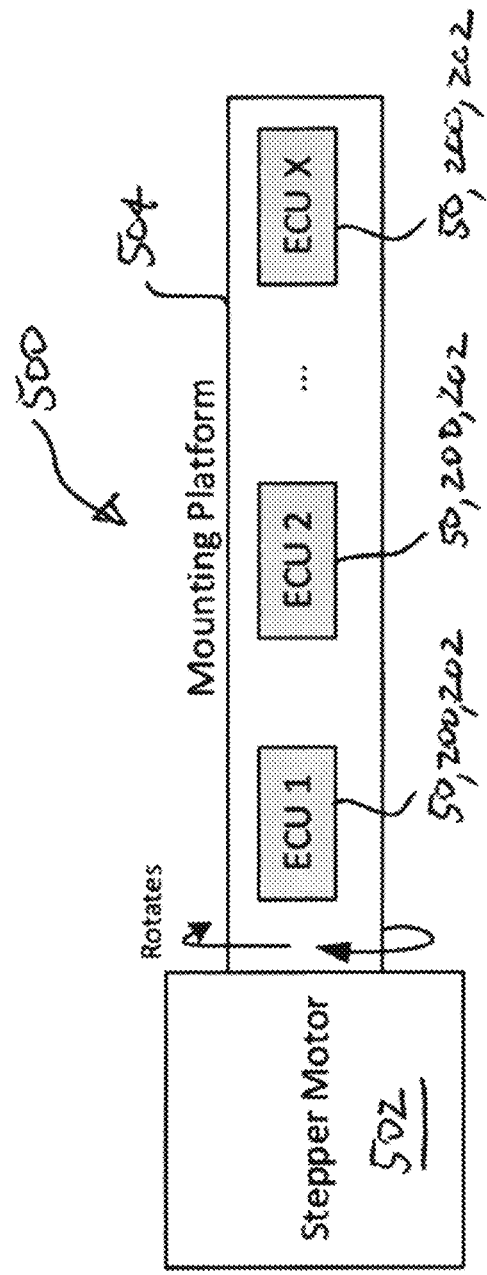
FIG. 14 shows a simplified view of another example calibration fixture, in accordance with aspects of the disclosure.

FIG. 14 shows a simplified view of another example calibration fixture 500. In the example of FIG. 14, the mounting platform 504 is configured to engage and support a plurality of the actuator controllers 50 (i.e., each including the accelerometer 200 within the actuator housing 202). The stepper motor 502 is configured to move the mounting platform 504 and the actuator housing 202 of each actuator controller 50 (and the accelerometer 200) to each of the plurality of angles starting with the starting position. Here, according to an aspect, only 9 measurements are required. This reduces the calibration time to less than 25 seconds per set of controllers 50. The mounting platform 504 can be extended to allow multiple controllers 50 to be calibrated at once.

The calibration data obtained during the calibration process is integrated into the controller 50 for adjusting accelerometer gain and offset before the accelerometer signal $a_{x,y,z}$ is used by the Force Compensation Module or haptic control algorithm 402 for inertia and inclination compensation. So, the actuator controller 50 is further configured to calculate a compensation force $F_{haptic}$ to be applied to the closure member 12 using the adjusted accelerometer signal $A_{adjusted}$.

Figure 15:
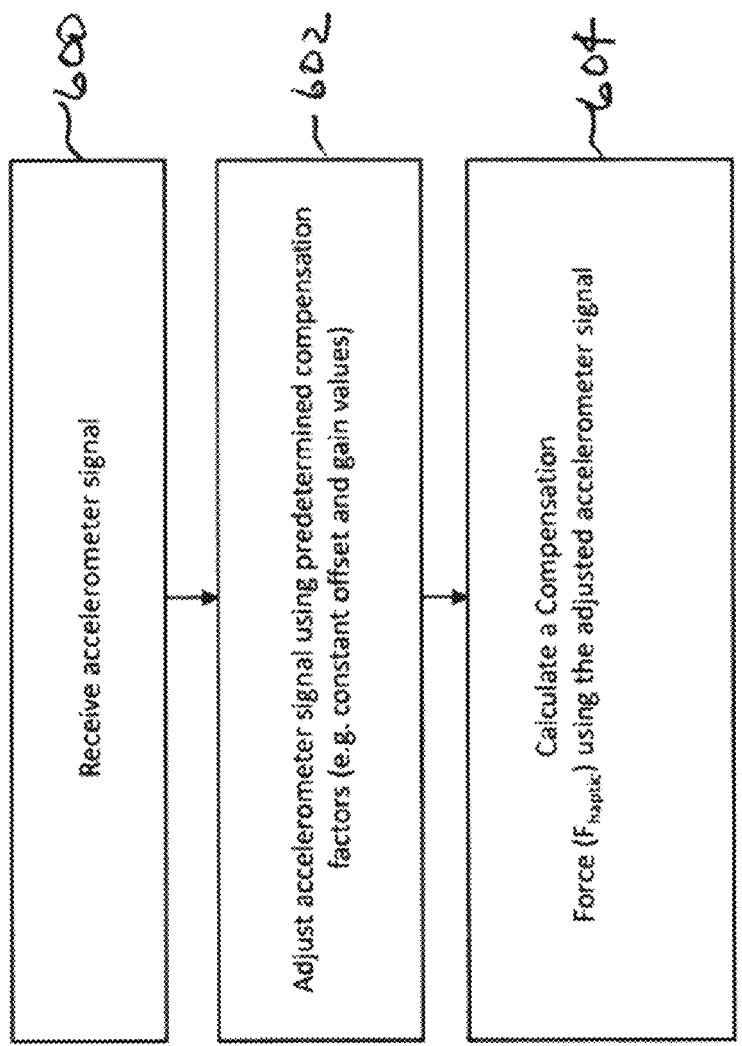
FIG. 15 illustrates steps of a method of compensating an accelerometer signal of an accelerometer installed in the vehicle, in accordance with aspects of the disclosure.

FIG. 15 illustrates steps of a method of compensating an accelerometer signal $a_{x,y,z}$ of an accelerometer 200 installed in a vehicle 10. As discussed above, the accelerometer 200 is for sensing movement of the closure member 12. The method includes the step of 600 receiving the accelerometer signal $a_{x,y,z}$ from the accelerometer 200. The next step of the method is 602 determining an adjusted accelerometer signal $A_{adjusted}$ as the accelerometer signal $a_{x,y,z}$ adjusted using one of a plurality of predetermined compensation factors determined through an accelerometer calibration process. The method continues by 604 calculating a compensation force $F_{haptic}$ to be applied to the closure member 12 using the adjusted accelerometer signal $A_{adjusted}$. According to an aspect, and as detailed below, the accelerometer calibration process can occur temporally before installation of the accelerometer 200 in the vehicle 10.

Figure 16:
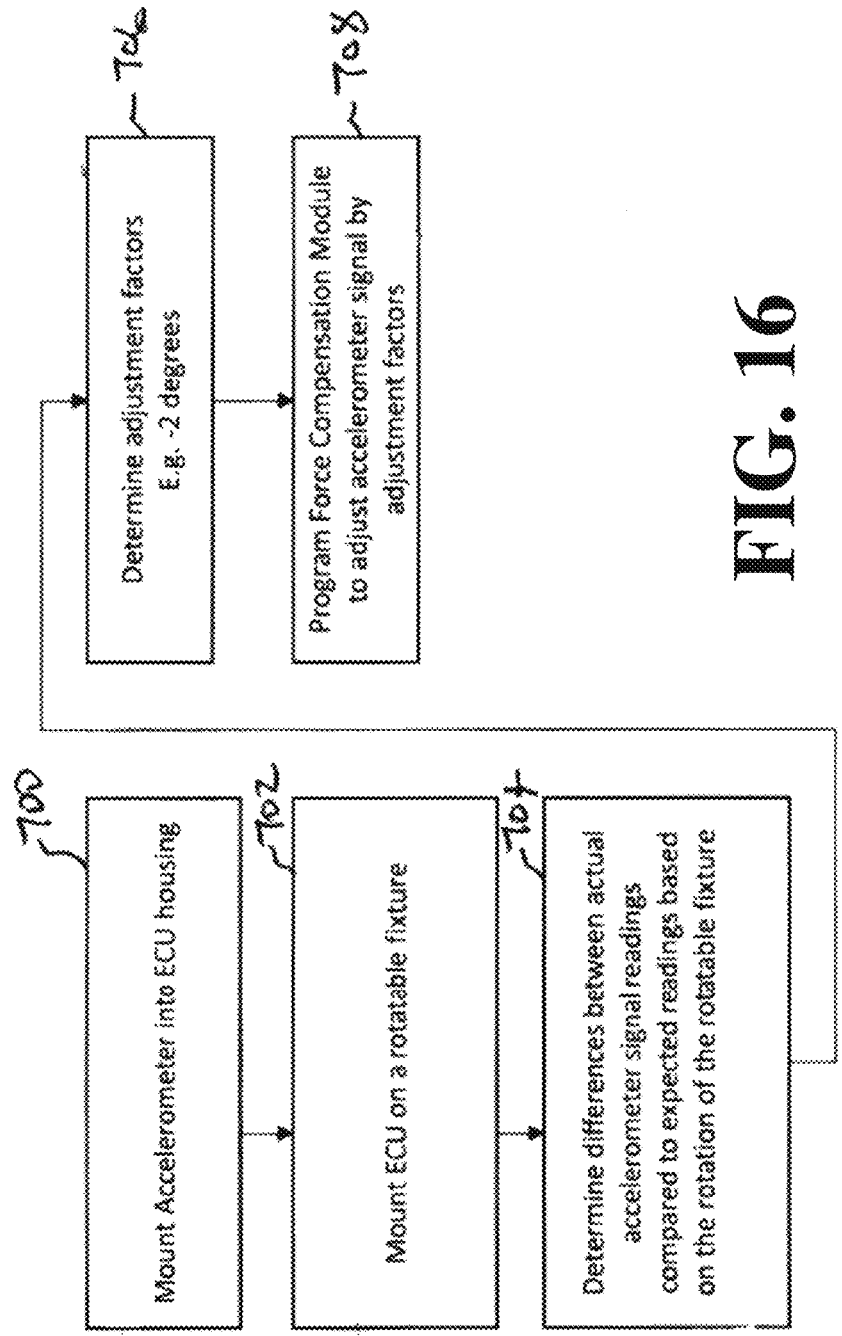
FIG. 16 illustrates steps of an accelerometer calibration process of the accelerometer of the vehicle, in accordance with aspects of the disclosure.

FIG. 16 illustrates steps of an accelerometer calibration process of an accelerometer 200 of a vehicle 10. The method includes the step of 700 mounting the accelerometer 200 in a controller housing 202 of a controller 50. It is advantageous to calibrate with the controller housing 202 as well, because there may be some offsets caused by how the accelerometer 200 sits in the actuator housing 202. The method proceeds by 702 mounting the controller housing 202 to a calibration fixture 500. The controllers 50 will be mounted in different orientations for different programs. Even if they are all side door programs, the mounting position of the controller 50 may vary. This may change angles chosen in the calibration process. The next step of the method is 704 orienting the controller housing 202 and the accelerometer 200 in each of a plurality of angles relative to a starting position using the calibration fixture 500 while simultaneously determining differences between an accelerometer signal $a_{x,y,z}$ obtained when the accelerometer 200 is oriented at each of the plurality of angles compared to a predetermined expected accelerometer signal for each of the plurality of angles. More specifically, according to an aspect, the method can include the step of creating a best fit line of the differences between an accelerometer signal $a_{x,y,z}$ obtained when the accelerometer 200 is oriented at each of the plurality of angles compared to the predetermined expected accelerometer signal for each of the plurality of angles. So, the differences between the predetermined expected and actual accelerometer values (i.e., accelerometer signal $a_{x,y,z}$) are measured, and then a best fit offset and gain values can be calculated. The predetermined expected values are known. For example, the mounting platform 504 will rotate the controllers 50 to 45 degrees. The value that the accelerometer is reading, accelerometer signal $a_{x,y,z}$, will be read. If the accelerometer signal $a_{x,y,z}$ indicates the controller 50 is at 43 degrees, it is known that there is an error of 2 degrees at this angle. Then all of these errors are used to create a best fit line. The method continues with the step of 706 determining a plurality of predetermined compensation factors based on the differences between the accelerometer signal $a_{x,y,z}$ and the predetermined expected accelerometer signal for each of the plurality of angles. The adjustment factors or predetermined compensation factors (Gain and Offset ($A_{offset}$)) are constant and are independent of door angle. The predetermined compensation factors can include offsets for X,Y,Z and also gain X,Y,Z values. Once identified, the predetermined compensation factors will be programed into the software. So, the method also includes the step of 708 programming an accelerometer compensation module 450 of the controller 50 to adjust the accelerometer signal $a_{x,y,z}$ to an adjusted accelerometer signal adjusted accelerometer signal $A_{adjusted}$ by the plurality of predetermined compensation factors. According to an aspect, the plurality of predetermined compensation factors include an accelerometer offset $A_{offset}$ and an accelerometer gain Gain independent of an angle of the closure member 12 relative to the vehicle body 14. In more detail, the adjusted accelerometer signal $A_{adjusted}$ may be equal to the accelerometer offset $A_{offset}$ added to or subtracted from the accelerometer gain multiplied by the accelerometer signal $a_{x,y,z}$ (i.e., $A_{adjusted} = A_{offset} +/- Gain \times a_{x,y,z}$) Thus, according to an aspect, the best fit offset and gain calibration values are added in the software of the controller 50 to minimize the overall error. There are offset values, which are add/subtractions on the accelerometer values. And there are gain values, which are in essence multipliers to the accelerometer signal $a_{x,y,z}$. The offsets and gain values are constant, no matter what the position of the door 12 is.

Clearly, changes may be made to what is described and illustrated herein without, however, departing from the scope defined in the accompanying claims. The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A system for opening or closing a closure member of a vehicle comprising:
    an actuator assembly comprising an electric motor operably coupled to an extensible member coupled to one of a body or the closure member for opening or closing the closure member;
    an accelerometer configured to sense one of movement and orientation of the closure member and output an accelerometer signal corresponding to the one of movement and orientation of the closure member sensed, wherein the electric motor is controlled using an adjusted accelerometer signal; and
    a controller coupled to the electric motor and to the accelerometer, wherein the controller is adapted to receive the accelerometer signal, generate the adjusted accelerometer signal, and control the electric motor based on the adjusted accelerometer signal, wherein the controller is further configured to determine the adjusted accelerometer signal as the accelerometer signal adjusted using one of a plurality of predetermined compensation factors determined through an accelerometer calibration process temporally before installation of the accelerometer in the vehicle.

2. The system as set forth in claim 1, wherein the accelerometer calibration process includes orienting the accelerometer in each of a plurality of angles relative to a starting position and simultaneously comparing the accelerometer signal obtained when the accelerometer is oriented at each of the plurality of angles with a predetermined expected accelerometer signal for each of the plurality of angles.

3. The system as set forth in claim 1, wherein the controller is further configured to calculate a compensation force to be applied to the closure member using the adjusted accelerometer signal.

4. The system as set forth in claim 3, wherein the controller includes:
    a closed loop current control system controlling a drive current provided to the electric motor for controlling the electric motor to apply the compensation force to the closure member; and
    a haptic control algorithm configured for calculating the compensation force to be provided to the closed loop current control system, wherein the closed loop current control system controls the drive current based on the compensation force.

5. The system of claim 4, further comprising a current sensor for detecting a sensed current flowing in the electric motor, wherein the haptic control algorithm is further configured to receive the sensed current and calculate a target torque.

6. The system of claim 5, further comprising a drive unit for converting the compensation force into a target current to be provided to the closed loop current control system.

7. The system of claim 6, wherein the haptic control algorithm includes a summation of a plurality of forces from a plurality of force calculations by a summer that outputs the target torque to the drive unit, the plurality of force calculations include a friction force calculation that receives a velocity of the closure member and outputs a friction force, a detent force calculation that receives a position of the closure member and outputs a detent force, an incline force calculation that receives the acceleration signal and outputs an incline force, an inertia force calculation that receives the acceleration signal and outputs an inertia force, a drive mode force calculation that receives the position of the closure member and the velocity of the closure member and outputs a drive mode force, a slam protect force calculation that receives the position of the closure member and the velocity of the closure member and outputs a slam protect force, and a user input torque force calculation that receives the sensed current from the current sensor 406 and outputs a user input torque force.

8. The system as set forth in claim 7, further including an accelerometer compensation module of the controller configured to adjust the accelerometer signal before the accelerometer signal is used by the incline force calculation and the inertia force calculation of the haptic control algorithm.

9. The system of claim 6, wherein the closed loop current control system includes a motor block connected to an H-bridge block and a subtractor configured to subtract a sensed current from the current sensor from the target current from the drive unit to output a corrected current to the motor block, the motor block and H-bridge block are configured to convert the corrected current to the drive current sensed by the current sensor.

10. An accelerometer calibration process for an accelerometer of a vehicle for sensing movement of a closure member, the process comprising the steps of:
mounting the accelerometer to a calibration fixture;
orienting the accelerometer in a plurality of angles using the calibration fixture;
obtaining an accelerometer signal when the accelerometer is oriented at each of the plurality of angles;
comparing the accelerometer signal to a predetermined expected accelerometer signal for each of the plurality of angles;
determining an operating irregularity of the accelerometer;
determining a plurality of predetermined compensation factors based on differences between the accelerometer signal and the predetermined expected accelerometer signal for each of the plurality of angles; and
adapting a controller to compensate for the operating irregularity of the accelerometer.

11. The process as set forth in claim 10, wherein adapting a controller to compensate for the determined irregularity of the accelerometer comprises adapting the controller to adjust the accelerometer signal to an adjusted accelerometer signal by the plurality of predetermined compensation factors.

12. The process as set forth in claim 10, further comprising:
mounting the accelerometer in a controller housing of the controller;
mounting the controller housing to the calibration fixture;
orienting the controller housing and the accelerometer in each of the plurality of angles relative to a starting position using the calibration fixture while simultaneously determining differences between the accelerometer signal obtained when the accelerometer is oriented at each of the plurality of angles compared to the predetermined expected accelerometer signal for each of the plurality of angles;
determining the plurality of predetermined compensation factors based on the differences between the accelerometer signal and the predetermined expected accelerometer signal for each of the plurality of angles; and
adjusting the accelerometer signal to an adjusted accelerometer signal by the plurality of predetermined compensation factors.

13. The process as set forth in claim 10, wherein the plurality of predetermined compensation factors include an accelerometer offset and an accelerometer gain independent of an angle of the closure member relative to a vehicle body.

14. The process as set forth in claim 13, wherein the adjusted accelerometer signal is equal to the accelerometer offset added to or subtracted from the accelerometer gain multiplied by the accelerometer signal.

15. A control system for controlling an electric motor of an actuator assembly used for opening or closing a closure member of a vehicle, the control system comprising:
an accelerometer configured to output an accelerometer signal; and
a controller configured to receive the accelerometer signal, the controller further adapted to adjust the accelerometer signal based on at least one predetermined parameter to generate an adjusted accelerometer signal, and control the electric motor using the adjusted accelerometer signal, wherein the controller is further configured to determine the adjusted accelerometer signal as the accelerometer signal adjusted using one of a plurality of predetermined compensation factors determined through an accelerometer calibration process temporally before installation of the accelerometer in the vehicle.

16. The control system as set forth in claim 15, wherein the accelerometer calibration process includes orienting the accelerometer in each of a plurality of angles relative to a starting position and comparing the accelerometer signal obtained when the accelerometer is oriented at each of the plurality of angles with a predetermined expected accelerometer signal for each of the plurality of angles.

* * * * *